(12) United States Patent
Tsujimoto

(10) Patent No.: US 11,657,794 B2
(45) Date of Patent: May 23, 2023

(54) AUDIO PROCESSING APPARATUS FOR REDUCING NOISE USING PLURALITY OF MICROPHONES, CONTROL METHOD, AND RECORDING MEDIUM

(71) Applicant: CANON KABUSHIKI KAISHA, Tokyo (JP)

(72) Inventor: Yuki Tsujimoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/410,358

(22) Filed: Aug. 24, 2021

(65) Prior Publication Data

US 2022/0068250 A1     Mar. 3, 2022

(30) Foreign Application Priority Data

Aug. 27, 2020 (JP) .............................. JP2020-143204
Sep. 25, 2020 (JP) .............................. JP2020-161436
Sep. 25, 2020 (JP) .............................. JP2020-161437
Sep. 25, 2020 (JP) .............................. JP2020-161438
Apr. 22, 2021 (JP) .............................. JP2021-072811

(51) Int. Cl.
  *G10K 11/178*   (2006.01)
  *H04R 3/00*     (2006.01)
  *H04R 1/10*     (2006.01)

(52) U.S. Cl.
  CPC ......... *G10K 11/178* (2013.01); *H04R 1/1083* (2013.01); *H04R 3/00* (2013.01)

(58) Field of Classification Search
  CPC ...... G10K 11/178; H04R 1/1083; H04R 3/00; H04R 1/028; H04R 3/005; H04R 5/027; H04R 2410/05; H04R 2499/11; H04N 5/232; H04N 5/232935; H04N 5/23296
  USPC ......................................................... 381/71.1
  See application file for complete search history.

(56) References Cited

U.S. PATENT DOCUMENTS

2015/0281834 A1* 10/2015 Takano .................. H04R 1/326
                                                              381/92
2018/0213323 A1*  7/2018 Ohtsuka ............... G10K 11/002

FOREIGN PATENT DOCUMENTS

JP         2011205527 A     10/2011

* cited by examiner

*Primary Examiner* — Vivian C Chin
*Assistant Examiner* — Friedrich Fahnert
(74) *Attorney, Agent, or Firm* — Canon U.S.A., Inc. IP Division

(57) ABSTRACT

An audio processing apparatus includes a first microphone configured to obtain ambient sound, a second microphone configured to obtain noise from a noise source, a first conversion unit configured to perform a Fourier transform on an audio signal from the first microphone to generate a first audio signal, a second conversion unit configured to perform a Fourier transform on an audio signal from the second microphone to generate a second audio signal, a generation unit configured to generate noise data by using the second audio signal and a parameter related to the noise from the noise source, a subtraction unit configured to subtract the noise data from the first audio signal, and a third conversion unit configured to perform an inverse Fourier transform on an audio signal from the subtraction unit.

19 Claims, 13 Drawing Sheets

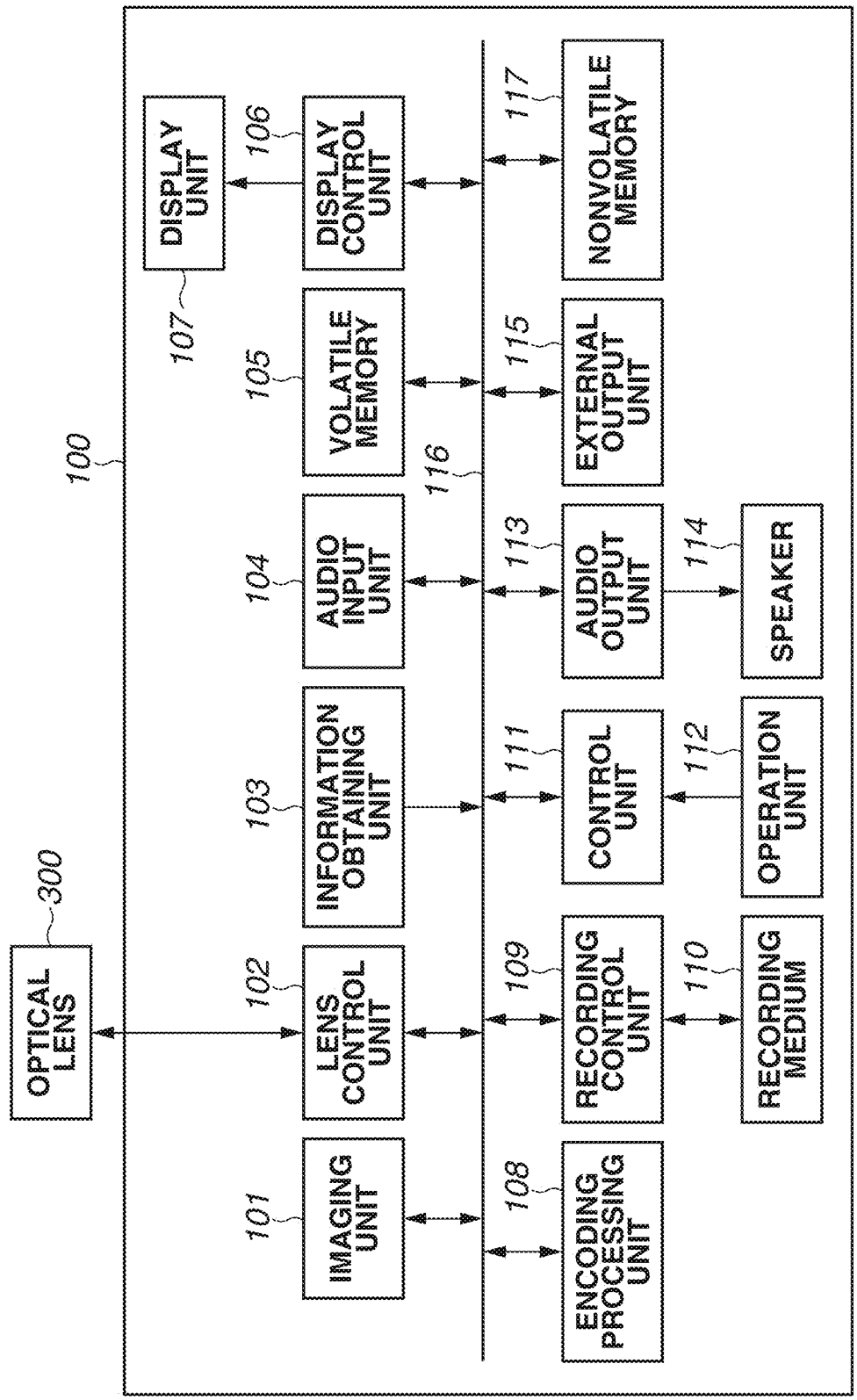

FIG.5

| NAME | NOISE TYPE | [0] | [1] | [2] | ... | [N-1] | [N] | [N+1] | ... | [511] | [512] |
|---|---|---|---|---|---|---|---|---|---|---|---|
| PL1 | WHITE NOISE | 0 | 0 | 0 | ... | 0.20 | 0.18 | 0.21 | ... | 0 | 0 |
| PL2 | SHORT-TERM NOISE | 0 | 0 | 0 | ... | 0.85 | 0.86 | 0.88 | ... | 0 | 0 |
| PL3 | LONG-TERM NOISE | 0 | 0 | 0 | ... | 0.80 | 0.79 | 0.85 | ... | 0 | 0 |
| ... | ... | | | | | | | | | | |
| PLx | OTHER NOISES | 0 | 0 | 0 | ... | 0.61 | 0.78 | 0.90 | ... | 0 | 0 |
| PR1 | WHITE NOISE | 0 | 0 | 0 | ... | 0.20 | 0.17 | 0.22 | ... | 0 | 0 |
| PR2 | SHORT-TERM NOISE | 0 | 0 | 0 | ... | 0.85 | 0.86 | 0.88 | ... | 0 | 0 |
| PR3 | LONG-TERM NOISE | 0 | 0 | 0 | ... | 0.81 | 0.78 | 0.86 | ... | 0 | 0 |
| ... | ... | | | | | | | | | | |
| PRx | OTHER NOISES | 0 | 0 | 0 | ... | 0.66 | 0.81 | 0.88 | ... | 0 | 0 |

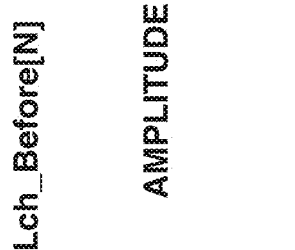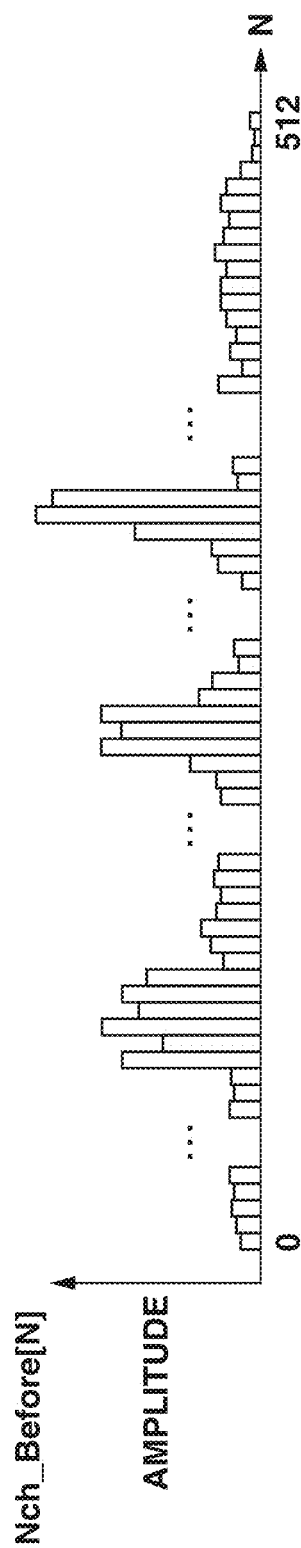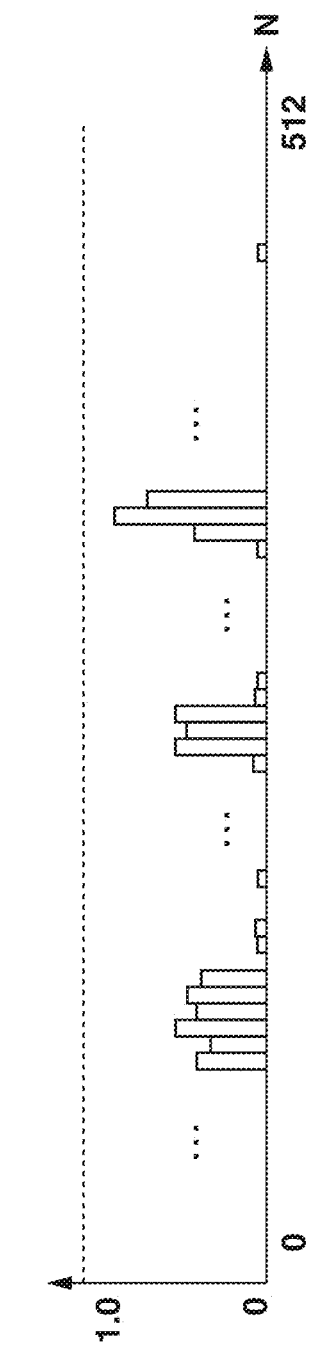

Lch_Before[N]

Nch_Before[N]

NL[N]

Lch_After[N]

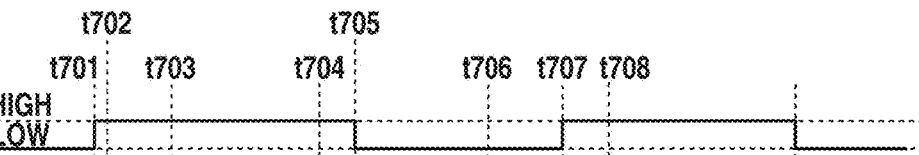
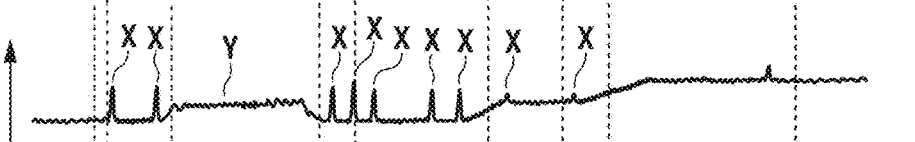
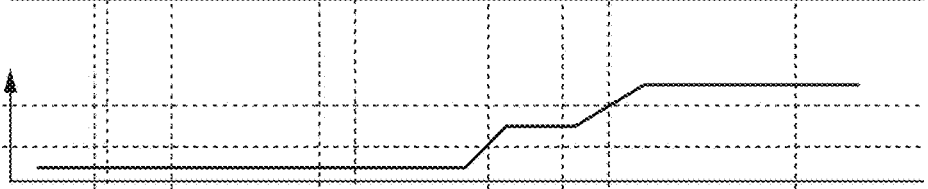
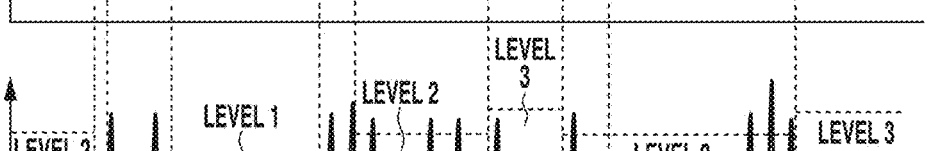
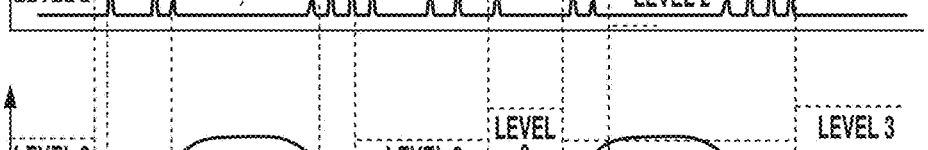
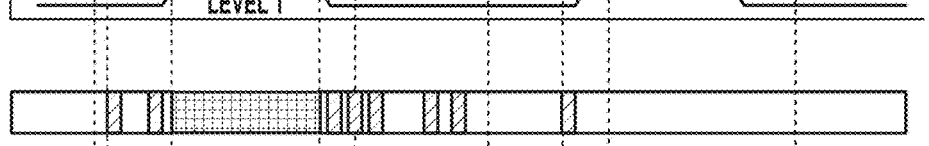
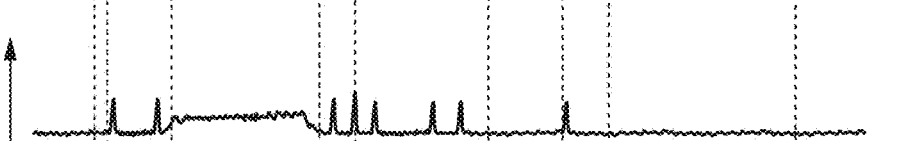

FIG. 12

| NAME | NOISE TYPE | [0] | [1] | [2] | ... | [N-1] | [N] | [N+1] | ... | [511] | [512] |
|---|---|---|---|---|---|---|---|---|---|---|---|
| PL1A | LENS 1 | 0 | 0 | 0 | ... | 0.50 | 0.88 | 0.79 | ... | 0 | 0 |
| PL2A | LENS 2 | 0 | 0 | 0 | ... | 0.85 | 0.86 | 0.88 | ... | 0 | 0 |
| PL3A | LENS 3 | 0 | 0 | 0 | ... | 0.80 | 0.79 | 0.85 | ... | 0 | 0 |
| ... | ... | | | | | | | | | | |
| PL1B | MOVING IMAGE MODE 1 | 0 | 0 | 0 | ... | 0.33 | 0.45 | 0.17 | ... | 0 | 0 |
| PL2B | MOVING IMAGE MODE 2 | 0 | 0 | 0 | ... | 0.20 | 0.17 | 0.22 | ... | 0 | 0 |
| PL3B | MOVING IMAGE MODE 3 | 0 | 0 | 0 | ... | 0.23 | 0.15 | 0.11 | ... | 0 | 0 |
| ... | ... | | | | | | | | | | |
| PR1A | LENS 1 | 0 | 0 | 0 | ... | 0.60 | 0.55 | 0.78 | ... | 0 | 0 |
| PR2A | LENS 2 | 0 | 0 | 0 | ... | 0.55 | 0.86 | 0.88 | ... | 0 | 0 |
| PR3A | LENS 3 | 0 | 0 | 0 | ... | 0.65 | 0.78 | 0.80 | ... | 0 | 0 |
| ... | ... | | | | | | | | | | |
| PR1B | MOVING IMAGE MODE 1 | 0 | 0 | 0 | ... | 0.42 | 0.62 | 0.23 | ... | 0 | 0 |
| PR2B | MOVING IMAGE MODE 2 | 0 | 0 | 0 | ... | 0.20 | 0.17 | 0.22 | ... | 0 | 0 |
| PR3B | MOVING IMAGE MODE 3 | 0 | 0 | 0 | ... | 0.23 | 0.44 | 0.15 | ... | 0 | 0 |

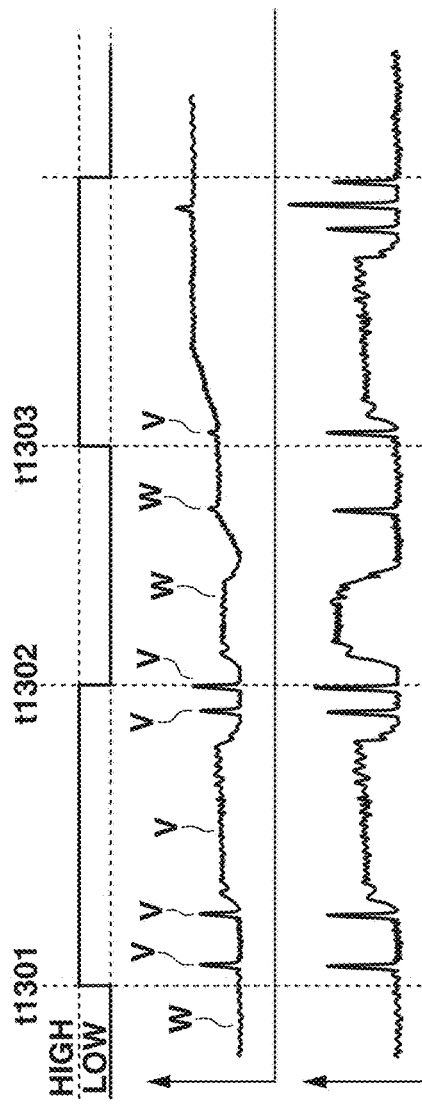

AUDIO PROCESSING APPARATUS FOR REDUCING NOISE USING PLURALITY OF MICROPHONES, CONTROL METHOD, AND RECORDING MEDIUM

BACKGROUND

Field of the Disclosure

The present disclosure relates to an audio processing apparatus capable of reducing noise included in audio data.

Description of the Related Art

A digital camera that is an example of an audio processing apparatus can record ambient sounds as well when recording moving image data. The digital camera has an autofocus function of focusing on an object during recording of moving image data by driving an optical lens. The digital camera also has a function of zooming in and out by driving the optical lens while recording a moving image.

If the optical lens is driven during recording of a moving image, driving noise of the optical lens can be included in sounds recorded with the moving image. A conventional digital camera can reduce noise and record ambient sounds if a sliding noise occurring from the driving of the optical lens is collected as the noise. Japanese Patent Application Laid-Open No. 2011-205527 discusses a digital camera that reduces noise using a spectral subtraction method.

According to Japanese Patent Application Laid-Open No. 2011-205527, the digital camera generates a noise pattern from noise collected by a microphone for recording ambient sounds. Thus, an exact noise pattern can be difficult to obtain from the sliding noise occurring inside the housing of the optical lens. In such a case, the digital camera can fail to effectively reduce noise included in the collected sounds.

SUMMARY

According to an aspect of the present disclosure, an audio processing apparatus includes a first microphone configured to obtain ambient sound, a second microphone configured to obtain noise from a noise source, a first conversion unit configured to perform a Fourier transform on an audio signal from the first microphone to generate a first audio signal, a second conversion unit configured to perform a Fourier transform on an audio signal from the second microphone to generate a second audio signal, a generation unit configured to generate noise data by using the second audio signal and a parameter related to the noise from the noise source, a subtraction unit configured to subtract the noise data from the first audio signal, and a third conversion unit configured to perform an inverse Fourier transform on an audio signal from the subtraction unit.

Further features of the present disclosure will become apparent from the following description of exemplary embodiments with reference to the attached drawings.

BRIEF DESCRIPTION OF THE DRAWINGS

FIG. 2 is a block diagram illustrating a configuration of the imaging apparatus according to the first exemplary embodiment.

FIG. 5 is a chart illustrating noise parameters according to the first exemplary embodiment.

FIGS. 6A, 6B, and 6C are charts illustrating frequency spectra of sounds and a frequency spectrum of noise parameters according to the first exemplary embodiment in a case where driving noise occurs in a situation where there is considered to be no ambient sound.

FIGS. 9A, 9B, 9C, 9D, 9E, 9F, 9G, 9H, and 9I are timing charts related to audio noise reduction processing according to the first exemplary embodiment.

FIG. 12 is a chart illustrating noise parameters according to the third exemplary embodiment.

FIGS. 13A, 13B, 13D, 13G, 13H1, 13H2, and 13I are timing charts related to audio noise reduction processing according to the third exemplary embodiment.

DESCRIPTION OF THE EMBODIMENTS

Exemplary embodiments of the present disclosure will be described in detail below with reference to the drawings.

External Views of Imaging Apparatus 100

Figure 1A:
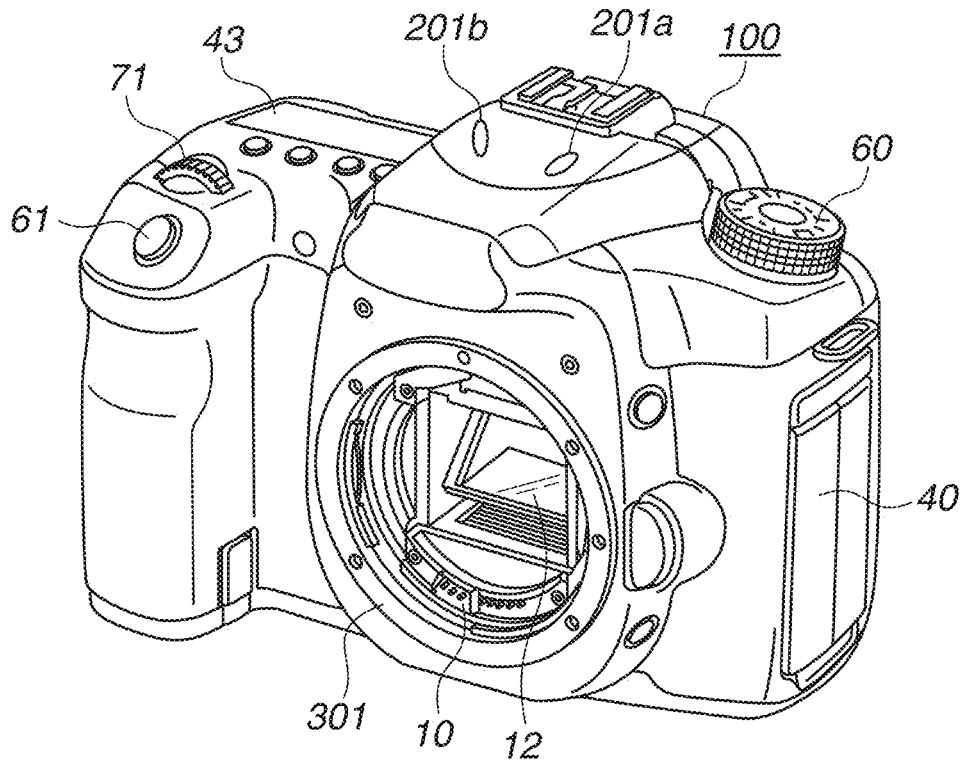
FIGS. 1A and 1B are perspective views of an imaging apparatus according to a first exemplary embodiment.
Figure 1B:
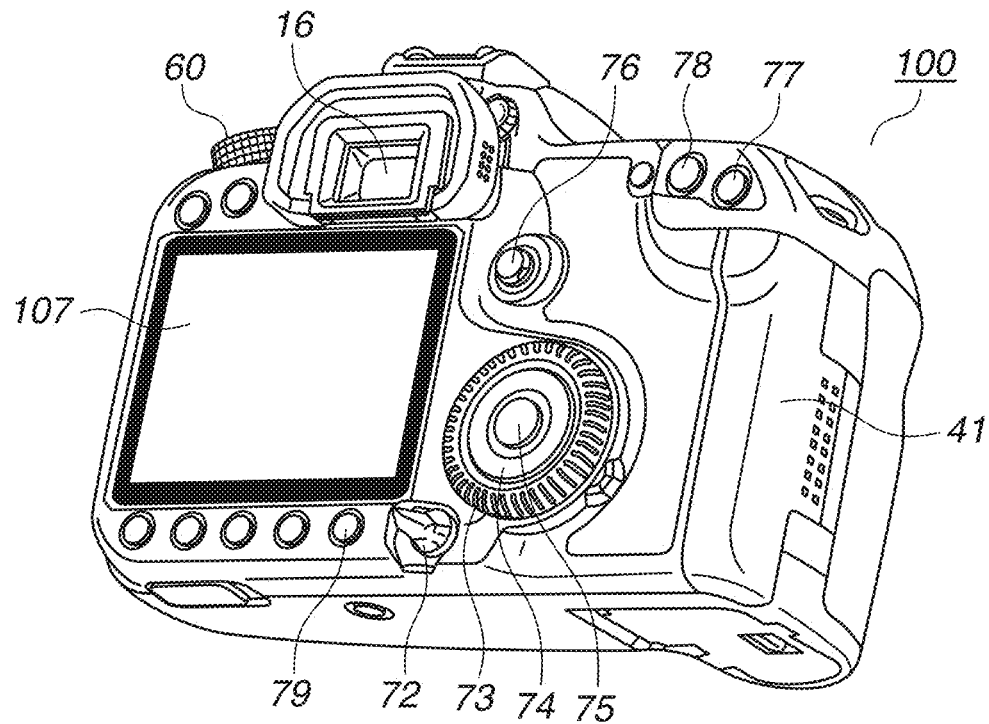

FIGS. 1A and 1B illustrate examples of external views of an imaging apparatus 100 that is an example of an audio processing apparatus to which the present disclosure is applicable. FIG. 1A is an example of a front perspective view of the imaging apparatus 100. FIG. 1B is an example of a rear perspective view of the imaging apparatus 100. In FIG. 1A, a not-illustrated optical lens is mounted on a lens mount 301.

A display unit 107 displays image data and text information. The display unit 107 is located on the back of the imaging apparatus 100. An extra-viewfinder display unit 43 is a display unit located on the top of the imaging apparatus 100. The extra-viewfinder display unit 43 displays setting values of the imaging apparatus 100, such as a shutter speed and an aperture value. An eyepiece viewfinder 16 is a look-through viewfinder. A user can check the focus and composition of an optical image of an object by observing a focusing screen in the eyepiece viewfinder 16.

A release switch 61 is an operation member for the user to give imaging instructions from. A mode selection switch 60 is an operation member for the user to switch between various modes. A main electronic dial 71 is a rotary operation member. The user can change setting values of the imaging apparatus 100, such as the shutter speed and the aperture value, by rotating the main electronic dial 71. The release switch 61, the mode selection switch 60, and the main electronic dial 71 are included in an operation unit 112.

A power switch 72 is an operation member for powering on and off the imaging apparatus 100. A sub electronic dial 73 is a rotary operation member. The user can move a selection frame displayed on the display unit 107 and forward images in a playback mode by using the sub electronic dial 73. A directional pad 74 is a directional pad (four-way key) capable of being pressed in top, bottom, left, and right portions. The imaging apparatus 100 performs processing based on the pressed portion (direction) of the directional pad 74. The power switch 72, the sub electronic dial 73, and the directional pad 74 are also included in the operation unit 112.

A set button 75 is a push button. The set button 75 is mainly used by the user to settle a selection item displayed on the display unit 107. A live view (LV) button 76 is a button used to switch on and off a live view. In a moving image recording mode, the LV button 76 is used to give instructions to start and stop capturing (recording) a moving image. An enlargement button 77 is a push button for turning on and off an enlargement mode in a live view display in an imaging mode, and changing an enlargement ratio in the enlargement mode. The set button 75, the LV button 76, and the enlargement button 77 are also included in the operation unit 112.

In the playback mode, the enlargement button 77 functions as a button for increasing the enlargement ratio of image data displayed on the display unit 107. A reduction button 78 is a button for reducing the enlargement ratio of the image data displayed on an enlarged scale on the display unit 107. A playback button 79 is an operation button for switching between the imaging mode and the playback mode. If the user presses the playback button 79 while the imaging apparatus 100 is in the imaging mode, the imaging apparatus 100 enters the playback mode and displays image data recorded on a recording medium 110 on the display unit 107. The reduction button 78 and the playback button 79 are also included in the operation unit 112.

A quick return mirror 12 (hereinafter, referred to as a mirror 12) is a mirror for redirecting a light beam from the optical lens mounted on the imaging apparatus 100 so that the light beam is incident on either the eyepiece viewfinder 16 or an imaging unit 101. The mirror 12 is moved up and down by a control unit 111 controlling a not-illustrated actuator during exposure, live view imaging, and moving image capturing. At normal times, the mirror 12 is located so that the light beam is incident on the eyepiece viewfinder 16. During imaging or a live view display, the mirror 12 flips up (mirror-up) so that the light beam is incident on the imaging unit 101. The mirror 12 includes a center portion that is a half mirror. Part of the light beam transmitted though the center portion of the mirror 12 is incident on a focus detection unit (not illustrated) for performing focus detection.

A communication terminal 10 is a communication terminal for an optical lens 300 mounted on the imaging apparatus 100 to communicate with the imaging apparatus 100. A terminal cover 40 is a cover for protecting a connector (not illustrated) for a connection cable that connects an external device to the imaging apparatus 100. A lid 41 is a lid for a slot accommodating the recording medium 110. The lens mount 301 is a mounting portion where the not-illustrated optical lens 300 can be mounted.

A left (L) microphone 201a and a right (R) microphone 201b are microphones for collecting sounds such as the user's voice. The L microphone 201a is located on the left and the R microphone 201b on the right when the imaging apparatus 100 is seen from the rear.

Configuration of Imaging Apparatus 100

FIG. 2 is a block diagram illustrating an example of a configuration of the imaging apparatus 100 according to the present exemplary embodiment.

The optical lens 300 is a lens unit detachably attachable to the imaging apparatus 100. Examples of the optical lens 300 include a zoom lens and a varifocal lens. The optical lens 300 includes an optical lens, a motor for diving the optical lens, and a communication unit that communicates with a lens control unit 102 of the imaging apparatus 100 to be described below. The optical lens 300 can perform focusing and zooming on an object and correct camera shakes by moving the optical lens using the motor based on a control signal received by the communication unit.

The imaging unit 101 includes an image sensor and an image processing unit. The image sensor is intended to convert an optical image of an object, formed on an imaging plane via the optical lens 300, into an electrical signal. The image processing unit generates image data or moving image data from the electrical signal generated by the image sensor, and outputs the image data or the moving image data. Examples of the image sensor include a charge-coupled device (CCD) sensor and a complementary metal-oxide-semiconductor (CMOS) sensor. In the present exemplary embodiment, a series of processes for generating image data including still image data and moving image data in the imaging unit 101 and outputting the image data from the imaging unit 101 will be referred to as "imaging" or "image capturing". The imaging apparatus 100 records the image data on the recording medium 110 to be described below based on a Design rule for Camera File system (DCF) standard.

The lens control unit 102 transmits control signals to the optical lens 300 via the communication terminal 10 to control the optical lens 300 based on data output from the imaging unit 101 and a control signal output from the control unit 111 to be described below.

An information obtaining unit 103 detects a tilt of the imaging apparatus 100 and temperature inside the housing of the imaging apparatus 100. For example, the information obtaining unit 103 detects the tilt of the imaging apparatus 100 by using an acceleration sensor or a gyro sensor. For example, the information obtaining unit 103 detects the temperature inside the housing of the imaging apparatus 100 by using a temperature sensor.

An audio input unit 104 generates audio data from sound obtained by a microphone. The audio input unit 104 obtains sound around the imaging apparatus 100 with the microphone, and performs analog-to-digital (A/D) conversion and various types of audio processing on the obtained sound to generate the audio data. In the present exemplary embodiment, the audio input unit 104 includes the microphone. A detailed configuration example of the audio input unit 104 will be described below.

A volatile memory 105 temporarily records the image data generated by the imaging unit 101 and the audio data generated by the audio input unit 104. The volatile memory 105 is also used as a temporary recording area for image data to be displayed on the display unit 107 and a work area of the control unit 111.

A display control unit 106 controls display of the image data output from the imaging unit 101, text for interactive operations, and a menu screen on the display unit 107. The display control unit 106 also controls sequential display of digital data output from the imaging unit 101 on the display unit 107 during still image capturing and moving image capturing, whereby the display unit 107 can be operated as an electronic viewfinder. Examples of the display unit 107 include a liquid crystal display and an organic electroluminescence (EL) display. The display control unit 106 can also control display of the image data and moving image data output from the imaging unit 101, the text for interactive operations, and the menu screen on an external display via an external output unit 115 to be described below.

An encoding processing unit 108 can encode both the image data and the audio data temporarily recorded in the volatile memory 105. For example, the encoding processing unit 108 can generate moving image data into which the image data is encoded and compressed based on a Joint Photographic Experts Group (JPEG) standard or a raw image format. For example, the encoding processing unit 108 can generate moving image data into which the moving image data is encoded and compressed based on a Moving Picture Experts Group-2 (MPEG-2) standard or an H.264/MPEG-4 Advanced Video Coding (AVC) standard. For example, the encoding processing unit 108 can generate audio data into which the audio data is encoded and compressed based on an Audio Code number 3 (AC3)/Advanced Audio Coding (AAC) standard, an Adaptive Transform Acoustic Coding (ATRAC) standard, or an adaptive differential pulse code modulation (ADPCM) method. The encoding processing unit 108 may encode the audio data without data compression, for example, based on a linear pulse code modulation (PCM) method.

A recording control unit 109 can record data on the recording medium 110 and read data from the recording medium 110. For example, the recording control unit 109 can record still image data, moving image data, and audio data generated by the encoding processing unit 108 on the recording medium 110, and read such data from the recording medium 110. Examples of the recording medium 110 include a Secure Digital (SD) card, a CompactFlash (CF) card, an Experimental Quality Determination (XQD) memory card, a hard disk drive (HDD) (magnetic disk), an optical disc, and a semiconductor memory. The recording medium 110 may be configured to be removably attachable to the imaging apparatus 100, or built in the imaging apparatus 100. In other words, the recording control unit 109 can include at least means for accessing the recording medium 110.

The control unit 111 controls the components of the imaging apparatus 100 via a data bus 116 based on input signals and programs to be described below. The control unit 111 includes a central processing unit (CPU), a read-only memory (ROM), and a random access memory (RAM) for performing various types of control. Instead of the control unit 111 controlling the entire imaging apparatus 100, a plurality of hardware components may control the entire imaging apparatus 100 in a distributed manner. The ROM included in the control unit 111 stores the programs for controlling the components. The RAM included in the control unit 111 is a volatile memory used for arithmetic processing.

The operation unit 112 is a user interface for accepting instructions about the imaging apparatus 100 from the user. For example, the operation unit 112 includes the power switch 72 for powering on and off the imaging apparatus 100, the release switch 61 for giving an imaging instruction, the playback button 79 for giving an instruction to reproduce image data or moving image data, and the mode selection switch 60.

The operation unit 112 outputs a control signal to the control unit 111 based on a user operation. A touch panel located on the display unit 107 can also be included in the operation unit 112. The release switch 61 includes a switch 1 (SW1) and a switch 2 (SW2). The SW1 turns on if the release switch 61 is half-pressed. The operation unit 112 thereby accepts a preparation instruction for performing imaging preparation operations such as automatic focus (AF) processing, automatic exposure (AE) processing, automatic white balance (AWB) processing, and electronic flash (EF) (preliminary flash emission) processing. The SW2 turns on if the release switch 61 is fully pressed. The operation unit 112 accepts an imaging instruction to perform an imaging operation through such a user operation. The operation unit 112 also includes an operation member (such as a button) capable of adjusting the volume level of audio data reproduced by a speaker 114 to be described below.

An audio output unit 113 can output audio data to the speaker 114 and the external output unit 115. Examples of audio data input to the audio output unit 113 include audio data read from the recording medium 110 by the recording control unit 109, audio data output from a nonvolatile memory 117, and audio data output from the encoding processing unit 108. The speaker 114 is an electroacoustic transducer capable of reproducing the audio data.

The external output unit 115 can output image data, moving image data, and audio data to an external device. The external output unit 115 includes a video terminal, a microphone terminal, and a headphone terminal, for example.

The data bus 116 is a data bus for transmitting various types of data such as audio data, moving image data, and image data, and various control signals to each block of the imaging apparatus 100.

The nonvolatile memory 117 is a nonvolatile memory that stores a program to be described below for the control unit 111 to execute. Audio data is also recorded in the nonvolatile memory 117. Examples of the audio data include audio data on electronic sounds such as an in-focus sound to be output when an object comes into focus, an electronic shutter sound to be output when an imaging instruction is given, and an operation sound to be output when the imaging apparatus 100 is operated.

Operation of Imaging Apparatus 100

An operation of the imaging apparatus 100 according to the present exemplary embodiment will now be described.

The imaging apparatus 100 according to the present exemplary embodiment powers the components of the imaging apparatus 100 from a not-illustrated power supply in response to being powered on by the user operating the power switch 72. Examples of the power supply include batteries such as a lithium-ion battery and an alkaline manganese dry cell.

In response to being powered, the control unit 111 determines, for example, which imaging mode or playback mode to operate in based on the state of the mode selection switch 60. In the moving image recording mode, the control unit 111 records moving image data output from the imaging unit 101 and audio data output from the audio input unit 104 as a single piece of moving image data with sound. In the playback mode, the control unit 111 reads image data or moving image data recorded on the recording medium 110 via the recording control unit 109, and controls display of the data on the display unit 107.

First, the moving image recording mode will be described. In the moving image recording mode, first, the control unit 111 transmits control signals to the components of the imaging apparatus 100 so that the imaging apparatus 100 enters an imaging standby state. For example, the control unit 111 controls the imaging unit 101 and the audio input unit 104 to perform the following operations.

The imaging unit 101 converts the optical image of an object, formed on the imaging plane via the optical lens 300, into an electrical signal and generates moving image data from the converted electrical signal. Then, the imaging unit 101 transmits the moving image data to the display control unit 106 to display the moving image data on the display unit 107. The user can make imaging preparations while viewing the moving image data displayed on the display unit 107.

The audio input unit 104 A/D-converts analog audio signals input from the respective plurality of microphones to generate a plurality of digital audio signals. Then, the audio input unit 104 generates a plurality of channels of audio data from the plurality of digital audio signals. The audio input unit 104 transmits the generated audio data to the audio output unit 113 to reproduce the audio data from the speaker 114. The user can adjust the volume level of the audio data to be recorded in the moving image data with sound by using the operation unit 112 while listening to the audio data reproduced from the speaker 114.

Next, the control unit 111 transmits an instruction signal for starting imaging to the components of the imaging apparatus 100 in response to pressing of the LV button 76 by the user. For example, the control unit 111 controls the imaging unit 101, the audio input unit 104, the encoding processing unit 108, and the recording control unit 109 to perform the following operations.

The imaging unit 101 converts the optical image of an object, formed on the imaging plane via the optical lens 300, into an electrical signal and generates moving image data from the converted electrical signal. Then, the imaging unit 101 transmits the moving image data to the display control unit 106 to display the moving image data on the display unit 107. The imaging unit 101 also transmits the generated moving image data to the volatile memory 105.

The audio input unit 104 A/D-converts the analog audio signals input from the respective plurality of microphones to generate a plurality of digital audio signals. Then, the audio input unit 104 generates multichannel audio data from the plurality of digital audio signals. The audio input unit 104 transmits the generated audio data to the volatile memory 105.

The encoding processing unit 108 reads the moving image data and the audio data temporarily recorded in the volatile memory 105, and encodes the moving image data and the audio data. The control unit 111 generates a data stream from the moving image data and the audio data encoded by the encoding processing unit 108, and outputs the data stream to the recording control unit 109. The recording control unit 109 records the input data stream on the recording medium 110 as moving image data with sound based on a file system such as Universal Disk Format (UDF) and File Allocation Table (FAT).

The components of the imaging apparatus 100 continue the foregoing operations during moving image capturing.

Then, the control unit 111 transmits an imaging end instruction signal to the components of the imaging apparatus 100 in response to pressing of the LV button 76 by the user. For example, the control unit 111 controls the imaging unit 101, the audio input unit 104, the encoding processing unit 108, and the recording control unit 109 to perform the following operations.

The imaging unit 101 stops generating the moving image data. The audio input unit 104 stops generating the audio data.

The encoding processing unit 108 reads the remaining moving image data and audio data recorded in the volatile memory 105, and encodes the moving image data and the audio data. The control unit 111 generates a data stream from the moving image data and the audio data encoded by the encoding processing unit 108, and outputs the data stream to the recording control unit 109.

The recording control unit 109 records the data stream on the recording medium 110 as a file of moving image data with sound based on the file system such as UDF and FAT. Then, the recording control unit 109 completes the moving image data with sound in response to the input of the data stream being stopped. The recording operation of the imaging apparatus 100 is stopped upon completion of the moving image data with sound.

The control unit 111 transmits control signals to the components of the imaging apparatus 100 to enter the imaging standby state in response to the recording operation being stopped. The control unit 111 thereby controls the imaging apparatus 100 to return to the imaging standby state.

Next, the playback mode will be described. In the playback mode, the control unit 111 transmits control signals to the components of the imaging apparatus 100 to enter a playback state. For example, the control unit 111 controls the encoding processing unit 108, the recording control unit 109, the display control unit 106, and the audio output unit 113 to perform the following operations.

The recording control unit 109 reads moving image data with sound recorded on the recording medium 110, and transmits the read moving image data with sound to the encoding processing unit 108.

The encoding processing unit 108 decodes the moving image data with sound into image data and audio data. The encoding processing unit 108 transmits the decoded moving image data to the display control unit 106 and the decoded audio data to the audio output unit 113.

The display control unit 106 displays the decoded image data on the display unit 107. The audio output unit 113 reproduces the decoded audio data using the speaker 114.

In such a manner, the imaging apparatus 100 according to the present exemplary embodiment can record and reproduce image data and audio data.

In the present exemplary embodiment, the audio input unit 104 performs audio processing such as level adjustment processing on the audio signals input from the microphones. In the present exemplary embodiment, the audio input unit 104 performs the audio processing in response to a start of moving image recording. The audio processing may be performed after the imaging apparatus 100 is powered on. The audio processing may be performed in response to selection of the imaging mode. The audio processing may be performed in response to selection of the moving image recording mode and a mode related to audio recording such as a voice memo function. The audio processing may be performed in response to a start of recording of the audio signals.

Configuration of Audio Input Unit 104

Figure 3:
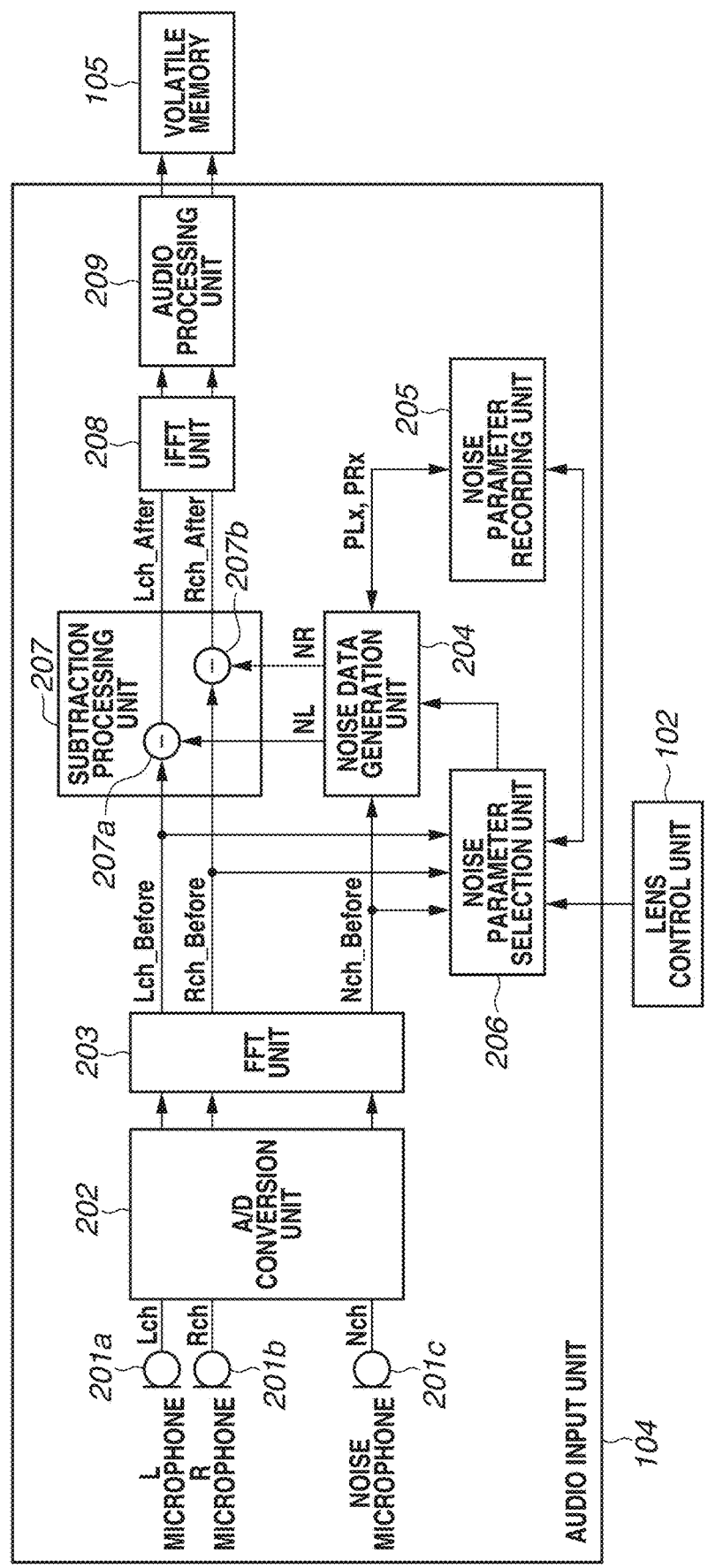
FIG. 3 is a block diagram illustrating a configuration of an audio input unit of the imaging apparatus according to the first exemplary embodiment.

FIG. 3 is a block diagram illustrating an example of a detailed configuration of the audio input unit 104 according to the present exemplary embodiment.

In the present exemplary embodiment, the audio input unit 104 includes three microphones, namely, the L microphone 201a, the R microphone 201b, and a noise microphone 201c. The L microphone 201a and the R microphone 201b are examples of a first microphone. In the present exemplary embodiment, the imaging apparatus 100 collects ambient sounds with the L microphone 201a and the R microphone 201b, and stereophonically records the audio signals input from the L microphone 201a and the R microphone 201b. Examples of the ambient sounds include sounds occurring outside the housing of the imaging apparatus 100 and outside the housing of the optical lens 300, such as the user's voice, animal sounds, rain sounds, and music.

The noise microphone 201c is an example of a second microphone. The noise microphone 201c is a microphone for obtaining noise occurring inside the housing of the imaging apparatus 100 and inside the housing of the optical lens 300, such as driving noise and other noises from a predetermined noise source. Examples of the noise source include a motor such as an ultrasonic motor (USM) or a stepping motor (STM). Examples of the noises include vibration noise caused by the driving of the motor such as a USM or an STM. For example, the motor is driven in the AF processing for focusing on an object. The imaging apparatus 100 obtains noise such as the driving noise occurring inside the housing of the imaging apparatus 100 and the housing of the optical lens 300 by using the noise microphone 201c, and generates a noise parameter to be described below using audio data on the obtained noise. In the present exemplary embodiment, the L microphone 201a, the R microphone 201b, and the noise microphone 201c are non-directional microphones. A layout example of the L microphone 201a, the R microphone 201b, and the noise microphone 201c in the present exemplary embodiment will be described below with reference to FIG. 4.

The L microphone 201a, the R microphone 201b, and the noise microphone 201c each generate an analog audio signal from obtained sounds and input the analog audio signal into an A/D conversion unit 202. The audio signal input from the L microphone 201a will be referred to as Lch, the audio signal input from the R microphone 201b as Rch, and the audio signal input from the noise microphone 201c as Nch.

The A/D conversion unit 202 converts the analog audio signals input from the L microphone 201a, the R microphone 201b, and the noise microphone 201c into digital audio signals. The A/D conversion unit 202 outputs the converted digital audio signals to a fast Fourier transform (FFT) unit 203. In the present exemplary embodiment, the A/D conversion unit 202 converts the analog audio signals into the digital audio signals by performing sampling processing with a sampling frequency of 48 kHz and a bit depth of 16 bits.

The FFT unit 203 applies FFT processing to the time-domain digital audio signals input from the A/D conversion unit 202, and thereby converts the digital audio signals into frequency-domain digital audio signals. In the present exemplary embodiment, the frequency-domain digital audio signals have a 1024-point frequency spectrum in a frequency band of 0 Hz to 48 kHz. The frequency-domain digital audio signals also have a 513-point frequency spectrum in a frequency band of 0 Hz to 24 kHz that is the Nyquist frequency. In the present exemplary embodiment, the imaging apparatus 100 performs noise reduction processing by using the 513-point frequency spectrum from 0 Hz to 24 kHz in the audio data output from the FFT unit 203.

Here, the FFT processed frequency spectrum of Lch is expressed by 513-point array data Lch_Before[0] to Lch_Before[512]. The pieces of array data Lch_Before[0] to Lch_Before[512] will be collectively referred to as Lch_Before. The FFT processed frequency spectrum of Rch is expressed by 513-point array data Rch_Before[0] to Rch_Before[512]. The pieces of array data Rch_Before[0] to Rch_Before[512] will be collectively referred to as Rch_Before. Lch_Before and Rch_Before are examples of first frequency spectrum data.

The FFT processed frequency spectrum of Nch is expressed by 513-point array data Nch_Before[0] to Nch_Before[512]. The pieces of array data Nch_Before[0] to Nch_Before[512] will be collectively referred to as Nch_Before. Nch_Before is an example of second frequency spectrum data.

A noise data generation unit 204 generates data for reducing noise included in Lch_Before and Rch_Before based on Nch_Before. In the present exemplary embodiment, the noise data generation unit 204 generates array data NL[0] to NL[512] for reducing noise included in Lch_Before[0] to Lch_Before[512], respectively, by using noise parameters. The noise data generation unit 204 also generates array data NR[0] to NR[512] for reducing noise included in Rch_Before[0] to Rch_Before[512], respectively. The frequency points of the array data NL[0] to NL[512] are the same as those of the array data Lch_Before[0] to Lch_Before[512]. The frequency points of the array data NR[0] to NR[512] are the same as those of the array data Rch_Before[0] to Rch_Before[512].

The pieces of array data NL[0] to NL[512] will be collectively referred to as NL. The pieces of array data NR[0] to NR[512] will be collectively referred to as NR. NL and NR are examples of third frequency spectrum data.

The noise parameters for the noise data generation unit 204 to use to generate NL and NR from Nch_Before are recorded in a noise parameter recording unit 205. Here, a plurality of types of noise parameters corresponding to respective noise types is recorded in the noise parameter recording unit 205. The noise parameters for generating NL from Nch_Before will be collectively referred to as PLx. The noise parameters for generating NR from Nch_Before will be collectively referred to as PRx.

PLx and PRx have the same number of array elements as those of NL and NR, respectively. For example, PL1 includes pieces of array data PL1[0] to PL1[512]. The frequency points of PL1 are the same as those of Lch_Before. For example, PR1 includes pieces of array data PR1[0] to PR1[512]. The frequency points of PR1 are the same as those of Rch_Before. The noise parameters will be described below with reference to FIG. 5.

A noise parameter selection unit 206 determines noise parameters to be used in the noise data generation unit 204 from among the noise parameters recorded in the noise parameter recording unit 205. The noise parameter selection unit 206 determines the noise parameters to be used in the noise data generation unit 204 based on Lch_Before, Rch_Before, Nch_Before, and data received from the lens control unit 102. An operation of the noise parameter selection unit 206 will be described in detail below with reference to FIG. 8.

In the present exemplary embodiment, all the coefficients for each 513-point frequency spectrum are recorded in the noise parameter recording unit 205 as noise parameters. However, instead of the coefficients corresponding to all the 513 frequency points, at least ones for frequency points used to reduce noise can be recorded in the noise parameter recording unit 205. For example, coefficients corresponding to each frequency spectrum of 20 Hz to 20 kHz, considered to be typical audible frequencies, may be recorded in the noise parameter recording unit 205 as noise parameters, without those corresponding to the other frequency spectra. For example, coefficients for frequency spectra where the coefficients have a value of zero do not need to be recorded in the noise parameter recording unit 205 as noise parameters.

A subtraction processing unit 207 subtracts NL and NR from Lch_Before and Rch_Before, respectively. For example, the subtraction processing unit 207 includes an L subtractor 207a for subtracting NL from Lch_Before, and an R subtractor 207b for subtracting NR from Rch_Before. The L subtractor 207a subtracts NL from Lch_Before to output 513-point array data Lch_After[0] to Lch_After[512]. The R subtractor 207b subtracts NR from Rch_Before to output 513-point array data Rch_After[0] to Rch_After[512]. In the present exemplary embodiment, the subtraction processing unit 207 performs the subtraction processing using a spectral subtraction method.

An inverse FFT (iFFT) unit 208 converts the frequency-domain digital audio signals input from the subtraction processing unit 207 into time-domain digital audio signals by inverse fast Fourier transform (inverse Fourier transform).

An audio processing unit 209 performs audio processing, such as equalizer processing, automatic level control processing, and stereophonic enhancement processing, on the time-domain digital audio signals. The audio processing unit 209 outputs the audio-processed audio data to the volatile memory 105.

In the present exemplary embodiment, the imaging apparatus 100 includes two microphones as the first microphone. However, the imaging apparatus 100 may include one microphone or three or more microphones as the first microphone. For example, if the audio input unit 104 includes one microphone as the first microphone, the imaging apparatus 100 monophonically records the audio data collected by the one microphone. For example, if the audio input unit 104 includes three or more microphones as the first microphone, the imaging apparatus 100 records the audio data collected by the three or more microphones using a surround-sound system.

In the present exemplary embodiment, the L microphone 201a, the R microphone 201b, and the noise microphone 201c are nondirectional microphones. However, these microphones may be directional microphones.

Layout of Microphones in Audio Input Unit 104

Figure 4:
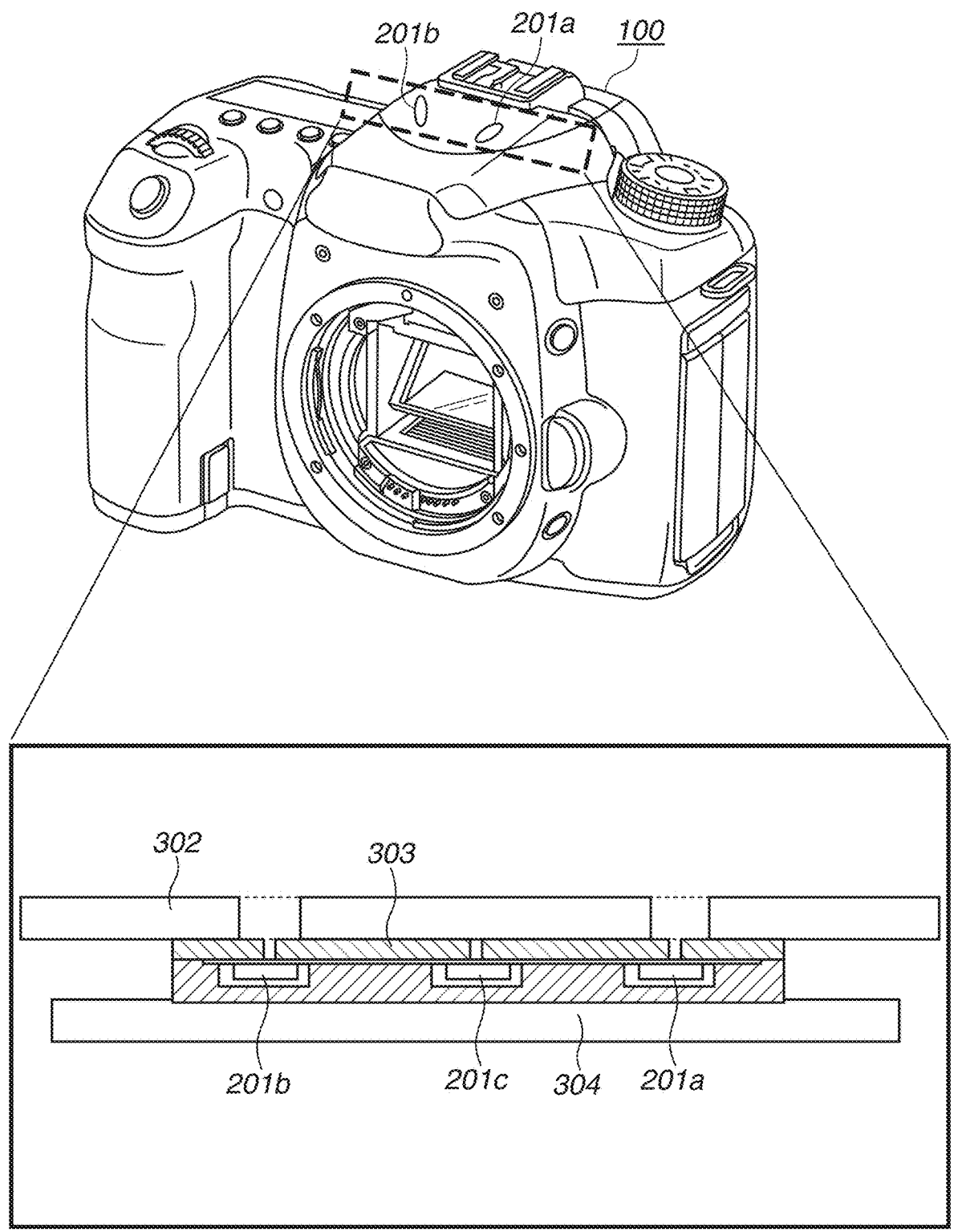
FIG. 4 is a diagram illustrating a layout of microphones in the audio input unit of the imaging apparatus according to the first exemplary embodiment.

A layout example of the microphones in the audio input unit 104 according to the present exemplary embodiment will now be described. FIG. 4 illustrates the layout example of the L microphone 201a, the R microphone 201b, and the noise microphone 201c.

FIG. 4 is an example of a sectional view of a portion of the imaging apparatus 100 where the L microphone 201a, the R microphone 201b, and the noise microphone 201c are attached. The portion of the imaging apparatus 100 includes an exterior unit 302, a microphone bushing 303, and a fixing unit 304.

The exterior unit 302 has holes (hereinafter, referred to as microphone holes) for inputting ambient sounds into the microphones. In the present exemplary embodiment, the microphone holes are formed over the L microphone 201a and the R microphone 201b. By contrast, the noise microphone 201c is intended to obtain driving noise occurring inside the housing of the imaging apparatus 100 and inside the housing of the optical lens 300, and does not need to obtain the ambient sounds. Thus, in the present exemplary embodiment, the exterior unit 302 has no microphone hole over the noise microphone 201c.

The L microphone 201a and the R microphone 201b obtain the driving noise occurring inside the housing of the imaging apparatus 100 and inside the housing of the optical lens 300 through the microphone holes. If the driving noise occurs inside the housings of the imaging apparatus 100 and the optical lens 300 without loud ambient sounds, the sounds obtained by the microphones consist mostly of the driving noise. Thus, the audio level (level of the audio signal) from the noise microphone 201c is higher than those from the L microphone 201a and the R microphone 201b. In such a case, the levels of the audio signals output from the microphones have the following relationship:

Lch≈Rch<Nch.

As the ambient sounds increase, the audio levels of the ambient sounds from the L microphone 201a and the R microphone 201b become higher than the audio level of the driving noise occurring inside the housings of the imaging apparatus 100 or the optical lens 300 from the noise microphone 201c. In such a case, the levels of the audio signals output from the microphones have the following relationship:

Lch≈Rch>Nch.

In the present exemplary embodiment, the microphone holes formed in the exterior unit 302 each have an elliptical shape. However, the microphone holes may each have another shape such as a circular or rectangular shape. The microphone hole over the L microphone 201a and the microphone hole over the R microphone 201b may have different shapes.

In the present exemplary embodiment, the noise microphone 201c is located close to the L microphone 201a and the R microphone 201b. In the present exemplary embodiment, the noise microphone 201c is located between the L microphone 201a and the R microphone 201b. Thus, the audio signal generated from the driving noise occurring inside the housing of the imaging apparatus 100 and inside the housing of the optical lens 300 by the noise microphone 201c is similar to those generated from the driving noise by the L microphone 201a and the R microphone 201b.

The microphone bushing 303 is a member for fixing the L microphone 201a, the R microphone 201b, and the noise microphone 201c. The fixing unit 304 is a member for fixing the microphone bushing 303 to the exterior unit 302.

In the present exemplary embodiment, the exterior unit 302 and the fixing unit 304 are made of molding members of polycarbonate (PC) material. The exterior unit 302 and the fixing unit 304 may be made of aluminum, stainless, or other metal members. In the present exemplary embodiment, the microphone bushing 303 is made of a rubber material such as ethylene propylene diene rubber.

Noise Parameters

FIG. 5 illustrates an example of the noise parameters recorded in the noise parameter recording unit 205. The noise parameters are parameters for correcting the audio signal generated by the noise microphone 201c obtaining the driving noise occurring inside the housing of the imaging apparatus 100 and inside the housing of the optical lens 300.

As illustrated in FIG. 5, in the present exemplary embodiment, PLx and PRx are recorded in the noise parameter recording unit 205. The present exemplary embodiment will be described on an assumption that the source of the driving noise is in the housing of the optical lens 300. The driving noise occurring inside the housing of the optical lens 300 is conveyed to inside the housing of the imaging apparatus 100 via the lens mount 301, and obtained by the L microphone 201*a*, the R microphone 201*b*, and the noise microphone 201*c*.

Driving noises have different frequencies depending on the types of driving noises. Thus, in the present exemplary embodiment, the imaging apparatus 100 records a plurality of noise parameters corresponding to respective types of driving noises. Then, the imaging apparatus 100 generates noise data using some of the plurality of noise parameters. In the present exemplary embodiment, the imaging apparatus 100 records noise parameters for white noise as a constant noise. The imaging apparatus 100 also records noise parameters for short-term noise occurring from meshing of gears in the optical lens 300, for example. The imaging apparatus 100 also records noise parameters for sliding noise in the housing of the optical lens 300 as long-term noise, for example. The imaging apparatus 100 may also record noise parameters with respect to each type of optical lens 300 as well as for each temperature inside the housing of the imaging apparatus 100 and each tilt of the imaging apparatus 100, detected by the information obtaining unit 103.

Method for Generating Noise Data

Noise data generation processing by the noise data generation unit 204 will be described with reference to FIGS. 6A, 6B, 6C, 7A, 7B, 7C, and 7D. While processing for generating noise data for Lch data will be described here, noise data for Rch data can be generated by a similar generation method.

First, processing for generating noise parameters in a situation where there is considered to be no ambient sounds will be described. FIG. 6A illustrates an example of the frequency spectrum of Lch_Before in a case where the driving noise occurs inside the housing of the optical lens 300 in the situation where there is considered to be no ambient sounds. FIG. 6B illustrates an example of the frequency spectrum of Nch_Before in the case where the driving noise occurs inside the housing of the optical lens 300 in the situation where there is considered to be no ambient sounds.

The horizontal axes indicate the frequencies at the 0th to 512nd points. The vertical axes indicate the amplitudes of the frequency spectra.

Since there is considered to be no ambient sounds, the frequency spectra of Lch_Before and Nch_Before have large amplitudes in similar frequency bands. Since the driving noise occurs inside the housing of the optical lens 300, the frequency spectrum of Nch_Before tends to have greater amplitudes than the frequency spectrum of Lch_Before does for the same driving noise.

FIG. 6C illustrates an example of PLx in the present exemplary embodiment. In the present exemplary embodiment, PLx includes the coefficients of the respective frequency spectral components, calculated by dividing the amplitudes of the respective frequency spectral components of Lch_Before by the amplitudes of the respective frequency spectral components of Nch_Before. The results of the division will be referred to as Lch_Before/Nch_Before. In other words, PLx represents the ratios of the amplitudes of Lch_Before to the amplitudes of Nch_Before. The values of Lch_Before/Nch_Before are recorded in the noise parameter recording unit 205 as the noise parameters PLx. Since the frequency spectrum of Nch_Before tends to have greater amplitudes than the frequency spectrum of Lch_Before does for the same driving noise as described above, the coefficients of the noise parameters PLx tend to have values smaller than 1. If Nch_Before[n] has a value smaller than a predetermined threshold, the noise parameter recording unit 205 records the noise parameters PLx with PLx[n]=0.

Figure 7A:
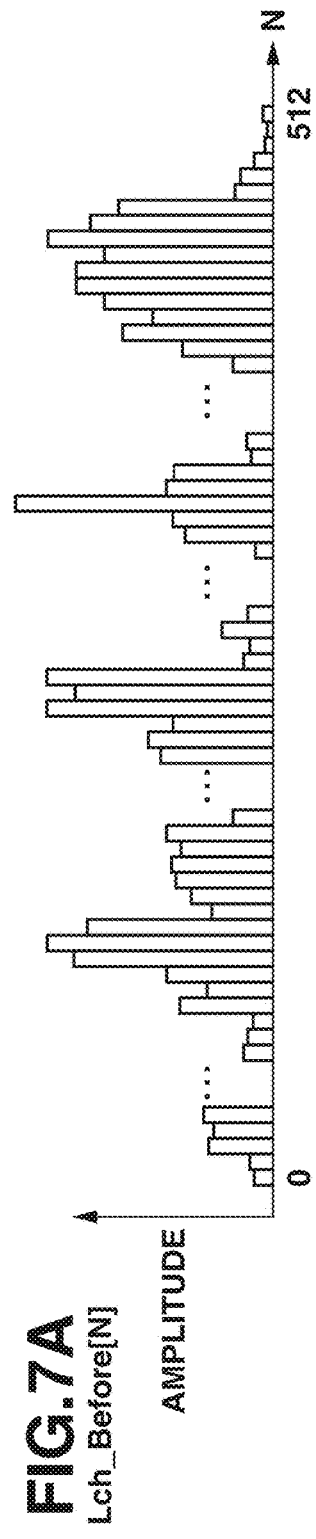
FIGS. 7A, 7B, 7C, and 7D are charts illustrating audio frequency spectra according to the first exemplary embodiment in a case where driving noise occurs in the presence of ambient sounds.
Figure 7B:
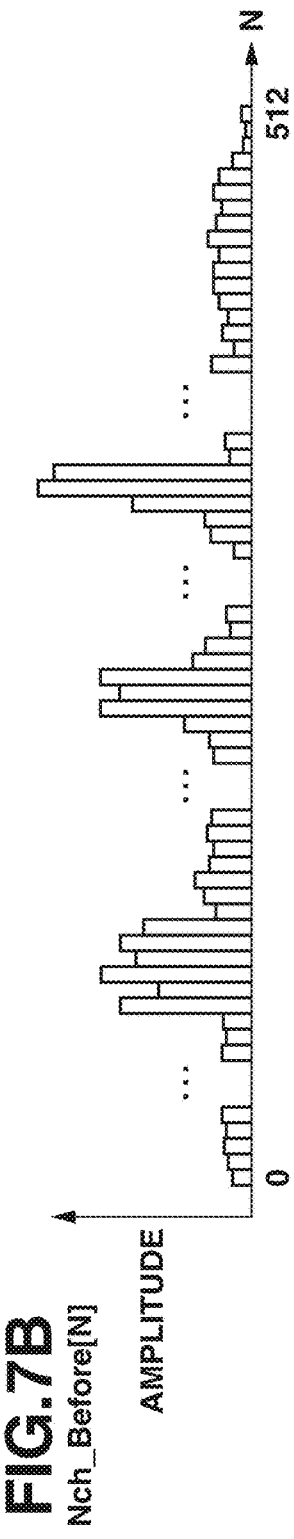

Next, processing for applying the generated noise parameters to Nch_Before will be described. FIG. 7A illustrates an example of the frequency spectrum of Lch_Before in a case where the driving noise occurs inside the housing of the optical lens 300 in the presence of ambient sounds. FIG. 7B illustrates an example of the frequency spectrum of Nch_Before in the case where the driving noise occurs inside the housing of the optical lens 300 in the presence of ambient sounds. The horizontal axes indicate the frequencies at the 0th to 512nd points. The vertical axes indicate the amplitudes of the frequency spectra.

Figure 7C:
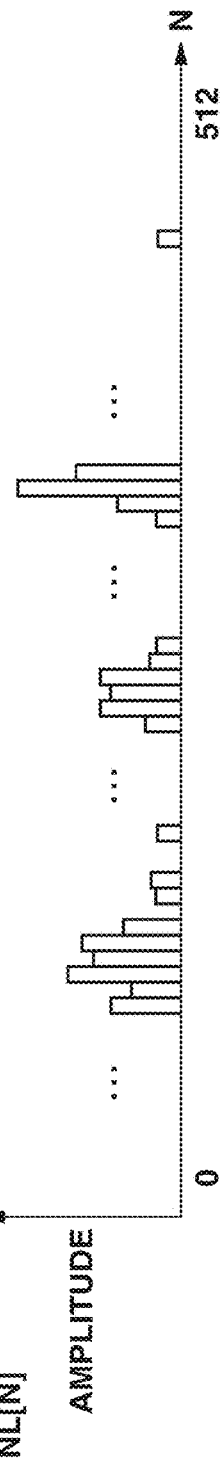

FIG. 7C illustrates an example of NL in the case where the driving noise occurs inside the housing of the optical lens 300 in the presence of ambient sounds. The noise data generation unit 204 generates NL by multiplying the frequency spectral components of Nch_Before by the respective coefficients of PLx. NL is a frequency spectrum generated in such a manner.

Figure 7D:
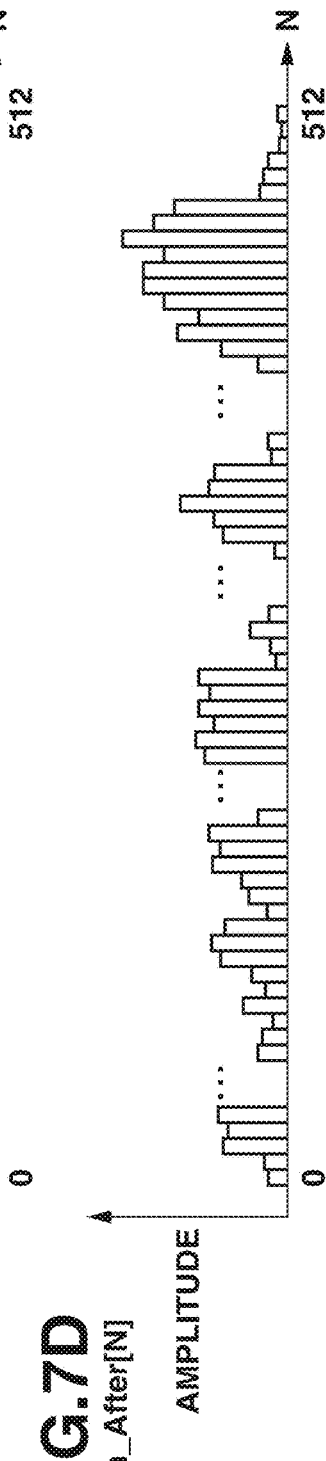

FIG. 7D illustrates an example of Lch_After in the case where the driving noise occurs inside the housing of the optical lens 300 in the presence of ambient sounds. The subtraction processing unit 207 subtracts NL from Lch_Before to generate Lch_After. Lch_After is a frequency spectrum generated in such a manner.

The imaging apparatus 100 can thereby reduce noise resulting from the driving noise inside the housing of the optical lens 300 and record the ambient sounds with less noise.

Description of Noise Parameter Selection Unit 206

Figure 8:
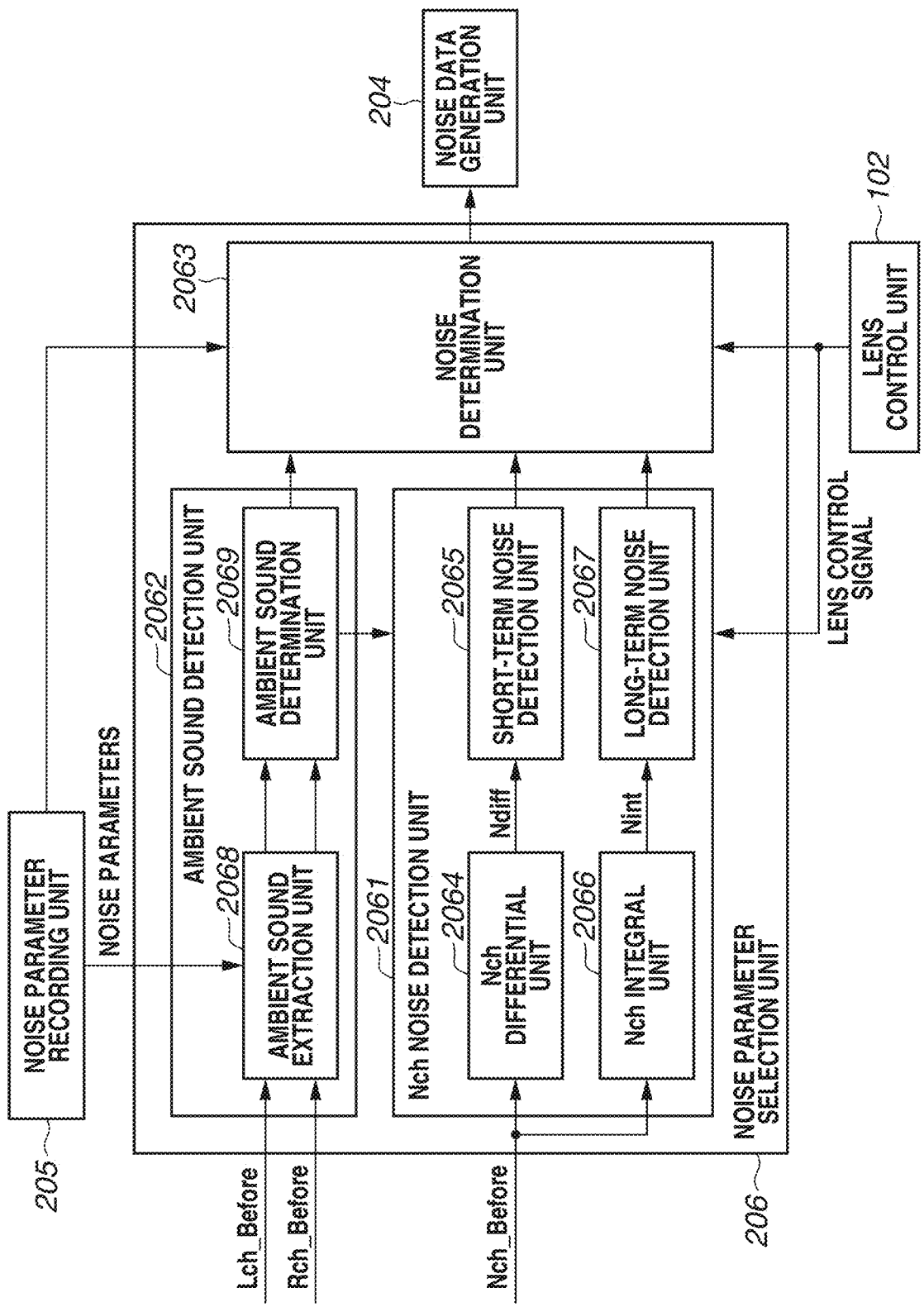
FIG. 8 is a block diagram illustrating a configuration of a noise parameter selection unit according to the first exemplary embodiment.

FIG. 8 is a block diagram illustrating an example of a detailed configuration of the noise parameter selection unit 206.

Lch_Before, Rch_Before, Nch_Before, and a lens control signal are input to the noise parameter selection unit 206.

An Nch noise detection unit 2061 detects noises ascribable to the driving noise occurring inside the housing of the optical lens 300 from Nch_Before. The Nch noise detection unit 2061 outputs data about detection results of the noises to a noise determination unit 2063 based on the detection results of the noises. In the present exemplary embodiment, the Nch noise detection unit 2061 detects the noises by using the 513-point data on Nch_Before.

An ambient sound detection unit 2062 detects an ambient sound level from Lch_Before and Rch_Before. The ambient sound detection unit 2062 outputs data on a detection result of the ambient sound level to the noise determination unit 2063 based on the detection result of the ambient sound level.

The noise determination unit 2063 determines noise parameters for the noise data generation unit 204 to use based on the lens control signal input from the lens control unit 102, the data input from the Nch noise detection unit 2061, and the data input from the ambient sound detection unit 2062. The noise determination unit 2063 outputs data indicating the type of the determined noise parameters to the noise data generation unit 204.

An Nch differential unit 2064 performs differential processing on Nch_Before. The Nch differential unit 2064 outputs data (Ndiff) indicating a result of the differential processing on Nch_Before to a short-term noise detection unit 2065. The short-term noise detection unit 2065 detects whether there is a short-term noise based on the data output from the Nch differential unit 2064. The short-term noise detection unit 2065 outputs data indicating whether there is a short-term noise to the noise determination unit 2063. The Nch differential unit 2064 and the short-term noise detection unit 2065 are included in the Nch noise detection unit 2061.

An Nch integral unit 2066 performs integral processing on Nch_Before. The Nch integral unit 2066 outputs data (Nint) indicating a result of the integral processing on Nch_Before to a long-term noise detection unit 2067. The long-term noise detection unit 2067 detects whether there is a long-term noise based on the data output from the Nch integral unit 2066. The long-term noise detection unit 2067 outputs data indicating whether there is a long-term noise to the noise determination unit 2063. The Nch integral unit 2066 and the long-term noise detection unit 2067 are included in the Nch noise detection unit 2061.

An ambient sound extraction unit 2068 extracts ambient sounds. In the present exemplary embodiment, the ambient sound extraction unit 2068 extracts data on frequencies at which the effect of noise is small based on the noise parameters. For example, the ambient sound extraction unit 2068 extracts data on frequencies at which the noise parameters are less than or equal to a predetermined value. Then, the ambient sound extraction unit 2068 outputs data indicating the magnitude of the ambient sounds based on the extracted data on the frequencies. The ambient sound extraction unit 2068 is included in the ambient sound detection unit 2062.

An ambient sound determination unit 2069 determines the magnitude of the ambient sounds. The ambient sound determination unit 2069 inputs the data indicating the determined magnitude of the ambient sounds to the Nch noise detection unit 2061 and the noise determination unit 2063. The Nch noise detection unit 2061 changes a first threshold and a second threshold to be described below based on the data indicating the magnitude of the ambient sounds, input from the ambient sound determination unit 2069. The ambient sound determination unit 2069 is included in the ambient sound detection unit 2062.

Timing Charts of Noise Reduction Processing

The noise reduction processing according to the present exemplary embodiment will be described with reference to FIGS. 9A, 9B, 9C, 9D, 9E, 9F, 9G, 9H, and 9I.

FIGS. 9A to 9I illustrate examples of timing charts of the audio processing by the noise data generation unit 204, the noise parameter selection unit 206, and the subtraction processing unit 207. The present exemplary embodiment describes audio processing on Lch for ease of description, whereas audio processing on Rch is similarly performed. All the horizontal axes of the graphs in FIGS. 9A to 9I are time axes.

FIG. 9A illustrates an example of the lens control signal. The lens control signal is a signal for the lens control unit 102 to control driving of the optical lens 300. In the present exemplary embodiment, the level of the lens control signal is expressed in two values, high and low. The level of the lens control signal is high if the lens control unit 102 is controlling the optical lens 300 to be driven. The level of the lens control signal is low if the lens control unit 102 is not controlling the optical lens 300 to be driven.

FIG. 9B is a graph illustrating an example of the value of Lch_Before[n]. The vertical axis indicates the value of Lch_Before[n]. In the present exemplary embodiment, Lch_Before[n] represents the signal at the nth frequency point where a signal indicating the driving noise of the optical lens 300 appears characteristically in Lch_Before output from the FFT unit 203. While the present exemplary embodiment describes the signal at the nth frequency point, the audio processing is also similarly performed on the other frequencies. Signals X and Y represent signals including noise. In the present exemplary embodiment, the signals X represent noise signals including a short-term noise. The signal Y represents a noise signal including a long-term noise.

FIG. 9C is a graph illustrating an example of the magnitude of the ambient sounds extracted by the ambient sound extraction unit 2068. The vertical axis indicates the level of the audio signal generated from the obtained ambient sounds. Thresholds Th1 and Th2 are two thresholds used in the ambient sound determination unit 2069.

FIG. 9D is a graph illustrating an example of the value of Nch_Before[n]. Nch_before[n] represents the signal at the nth frequency point where a signal indicating the driving noise of the optical lens 300 appears characteristically in Nch_Before output from the FFT unit 203. The vertical axis indicates the value of Nch_Before[n]. The noise signals represented by the signals X and Y in FIG. 9B appear more characteristically in Nch_Before[n] than in Lch_Before[n].

FIG. 9E is a graph illustrating an example of the value of Ndiff[n]. Ndiff[n] indicates the value of the signal at the nth frequency point in Ndiff output from the Nch differential unit 2064. The vertical axis indicates the value of Ndiff[n]. The greater the amount of change in the value of Nch_Before[n] per predetermined time, the greater the value of Ndiff[n]. To detect short-term noise, the short-term noise detection unit 2065 has a threshold Th_Ndiff[n] that is the first threshold. The threshold Th_Ndiff[n] changes between levels 1 to 3 depending on the data indicating the magnitude of the ambient sounds, input from the ambient sound determination unit 2069, and the lens control signal. An initial value of the threshold Th_Ndiff[n] is level 2. The levels of the threshold Th_Ndiff[n] are indicated by horizontal broken lines.

FIG. 9F is a graph illustrating an example of the value of Nint[n]. In the present exemplary embodiment, Nint[n] indicates the value of the signal at the nth frequency point in Nint output from the Nch integral unit 2066. The vertical axis indicates the value of Nint[n]. The value of Nint[n] increases if Nch_Before[n] is continuously large in value. To detect long-term noise, the long-term noise detection unit 2067 has a threshold Th_Nint[n] that is the second threshold. The threshold Th_Nint[n] changes between levels 1 to 3 depending on the data indicating the magnitude of the ambient sounds, input from the ambient sound determination unit 2069, and the lens control signal. An initial value of the threshold Th_Nint[n] is level 2. The levels of the threshold Th_Nint[n] are indicated by horizontal broken lines.

FIG. 9G illustrates examples of noise parameters selected by the noise parameter selection unit 206. In the present exemplary embodiment, blank sections indicate selection of only the noise parameter PL1. Hatched sections indicate selection of the noise parameters PL1 and PL2.

Lattice-patterned sections indicate selection of the noise parameters PL1 and PL3.

FIG. 9H is a graph illustrating an example of the value of NL[n]. In the present exemplary embodiment, NL[n] indicates the value of the signal at the nth frequency point in NL generated by the noise data generation unit 204. The vertical axis indicates the value of NL[n].

FIG. 9I is a graph illustrating an example of the value of Lch_After[n]. In the present exemplary embodiment, Lch_After[n] indicates the value of the signal at the nth frequency point in Lch_After output from the subtraction processing unit 207. The vertical axis indicates the value of Lch_After[n].

Next, the timing of the operations will be described with reference to times t701 to t708.

At time t701, the lens control unit 102 outputs a high signal to the optical lens 300 and the noise parameter selection unit 206 as the lens control signal (FIG. 9A). At time t701, the short-term noise detection unit 2065 lowers the threshold Th_Ndiff[n] to level 1 (FIG. 9E) since the driving noise is likely to occur inside the housing of the optical lens 300. At time t701, the long-term noise detection unit 2067 also lowers the threshold Th_Nint[n] to level 1 (FIG. 9F) since the driving noise is likely to occur inside the housing of the optical lens 300.

At time t702, the optical lens 300 is driven to cause short-term driving noises such as gear meshing noises. The noise microphone 201c collects the short-term driving noises, and the value of Ndiff[n] exceeds the threshold Th_Ndiff[n] (FIG. 9E). In response, the noise parameter selection unit 206 selects the noise parameters PL1 and PL2 (FIG. 9G). The noise data generation unit 204 generates NL[n] based on Nch_Before[n] and the noise parameters PL1 and PL2 (FIG. 9H). The subtraction processing unit 207 subtracts NL[n] from Lch_Before[n] to output Lch_After[n] (FIG. 9I). Lch_After[n] here is an audio signal with reduced constant and short-term noises.

At time t703, the optical lens 300 starts continuous driving, and a long-term driving noise such as a sliding noise occurs inside the housing of the optical lens 300. The noise microphone 201c collects the long-term driving noise, and the value of Nint[n] exceeds the threshold Th_Nint[n] (FIG. 9F). In response, the noise parameter selection unit 206 selects the noise parameters PL1 and PL3 (FIG. 9G). The noise data generation unit 204 generates NL[n] based on Nch_Before[n] and the noise parameters PL1 and PL3 (FIG. 9H). The subtraction processing unit 207 subtracts NL[n] from Lch_Before[n] to output Lch_After[n] (FIG. 9I). Lch_After[n] here is an audio signal with reduced constant and long-term noises.

At time t704, the optical lens 300 stops the continuous driving. Since the noise microphone 201c stops collecting the long-term driving noise, the value of Nint[n] falls to or below the threshold Th_Nint[n] (FIG. 9F). In response, the noise parameter selection unit 206 selects the noise parameter PL1 (FIG. 9G). The noise data generation unit 204 generates NL[n] based on Nch_Before[n] and the noise parameter PL1 (FIG. 9H). The subtraction processing unit 207 subtracts NL[n] from Lch_Before[n] to output Lch_After[n] (FIG. 9I). Lch_After[n] here is an audio signal with a reduced constant noise.

At time t705, the lens control unit 102 outputs a low signal to the optical lens 300 and the noise parameter selection unit 206 as the lens control signal (FIG. 9A). In such a case, the short-term noise detection unit 2065 raises the threshold Th_Ndiff[n] to level 2 (FIG. 9E) since the driving noise is less likely to occur inside the housing of the optical lens 300. The long-term noise detection unit 2067 also raises the threshold Th_Nint[n] to level 2 (FIG. 9F) since the driving noise is less likely to occur inside the housing of the optical lens 300.

At time t706, the magnitude of the ambient sounds extracted by the ambient sound extraction unit 2068 exceeds the threshold Th1. The short-term noise detection unit 2065 raises the threshold Th_Ndiff[n] to level 3 (FIG. 9E) since the loud ambient sounds make the noise included in the audio signal less perceptible to the user. The long-term noise detection unit 2067 also raises the threshold Th_Nint[n] to level 3 (FIG. 9F) since the loud ambient sound makes the noise included in the audio signal less perceptible to the user.

At time t707, the lens control unit 102 outputs a high signal to the optical lens 300 and the noise parameter selection unit 206 as the lens control signal (FIG. 9A). In such a case, the short-term noise detection unit 2065 lowers the threshold Th_Ndiff[n] to level 2 (FIG. 9E) since the driving noise is likely to occur inside the housing of the optical lens 300. The long-term noise detection unit 2067 also lowers the threshold Th_Nint[n] to level 2 (FIG. 9F) since the driving noise is likely to occur inside the housing of the optical lens 300.

At time t708, the magnitude of the ambient sounds extracted by the ambient sound extraction unit 2068 exceeds the threshold Th2. Here, the noise parameter selection unit 206 selects only the noise parameter PL1 regardless of the data input from the Nch noise detection unit 2061. Since such extremely loud ambient sounds make the noise included in the audio signal imperceptible to the user, the imaging apparatus 100 reduces only a constant noise to record more natural ambient sounds than that when the processing for reducing short-term and long-term noises is further performed.

As described above, the imaging apparatus 100 can record ambient sounds with reduced noise by performing the noise reduction processing using the noise microphone 201c that is the second microphone.

The imaging apparatus 100 detects an occurrence of noise using the output signal of the noise microphone 201c, and sets noise parameters in synchronization with the detection timing of the occurrence of the noise. Thus, the imaging apparatus 100 can appropriately set the noise parameters and appropriately reduce the noise in synchronization with the occurrence of the noise.

If the magnitude of the ambient sounds is less than or equal to the threshold Th2, the imaging apparatus 100 performs the noise reduction processing based on the noise detected by the Nch noise detection unit 2061. If the magnitude of the ambient sound is greater than the threshold Th2, the imaging apparatus 100 reduces only a constant noise. The imaging apparatus 100 can thereby record ambient sounds in which noise is reduced to give less sense of strangeness to the user based on the magnitude of the ambient sounds.

While, in the present exemplary embodiment, the imaging apparatus 100 reduces the driving noise occurring inside the housing of the optical lens 300, the imaging apparatus 100 may reduce the driving noise occurring in the imaging apparatus 100. Examples of the driving noise occurring in the imaging apparatus 100 include acoustic noise from a substrate and radio wave noise. An example of the acoustic noise from a substrate is a noise caused by creaking of the substrate when a voltage is applied to a capacitor on the substrate.

The thresholds Th1 and Th2 of the ambient sound determination unit 2069, the threshold Th_Ndiff[n] of the short-term noise detection unit 2065, and the threshold Th_Nint[n] of the long-term noise detection unit 2067 are determined based on the driving noise and the ambient sounds that occur. Thus, the imaging apparatus 100 may change the thresholds depending on factors such as the type of the optical lens 300 and the tilt of the imaging apparatus 100.

Figure 10:
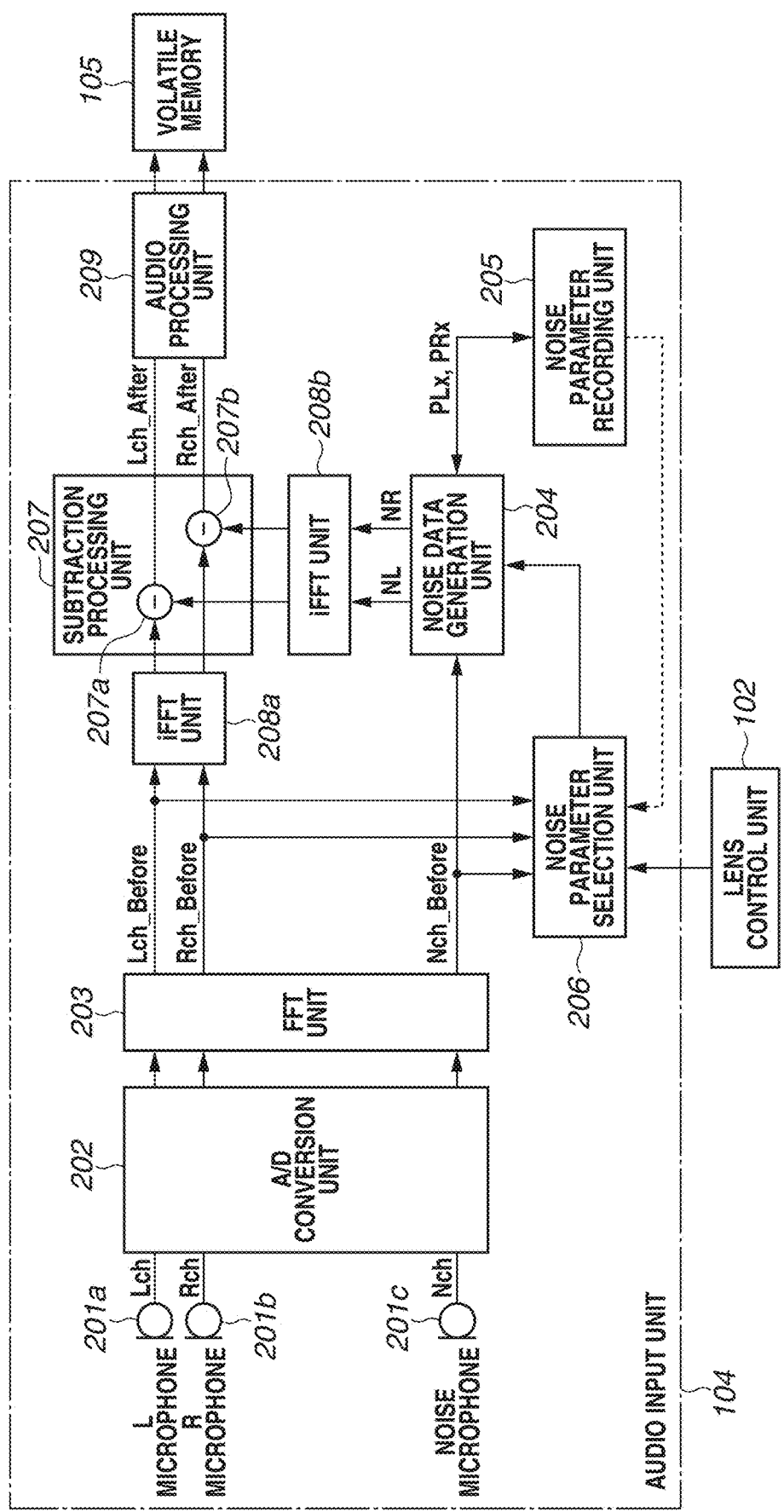
FIG. 10 is a block diagram illustrating a configuration of an audio input unit of an imaging apparatus according to a second exemplary embodiment.

FIG. 10 is a block diagram illustrating a configuration example of an audio input unit 104 according to a second exemplary embodiment. Differences from the configuration of the audio input unit 104 illustrated in FIG. 3 lie in the subtraction processing unit 207 and the iFFT unit 208. A description of processing units similar to those of FIG. 3 will be omitted here.

An iFNT unit 208a performs iFFT on Lch_Before and Rch_Before input from the FFT unit 203 and thereby converts the frequency-domain digital audio signals into respective time-domain digital audio signals. An iFFT unit 208b performs iFFT on NL and NR and thereby converts the frequency-domain digital audio signals into respective time-domain digital audio signals.

The subtraction processing unit 207 subtracts the digital audio signals input by the iFFT unit 208b from the digital audio signals input by the iFFT unit 208a. The subtraction processing unit 207 performs the arithmetic processing using a waveform subtraction method for subtracting the digital audio signals in a time domain.

In performing the waveform subtraction, the imaging apparatus 100 may also record parameters related to the phases of the digital audio signals as noise parameters.

The rest of the configuration and operations of the imaging apparatus 100 are similar to those of the first exemplary embodiment.

A third exemplary embodiment deals with a configuration where an imaging apparatus 100 includes two subtraction processing units.

Figure 11:
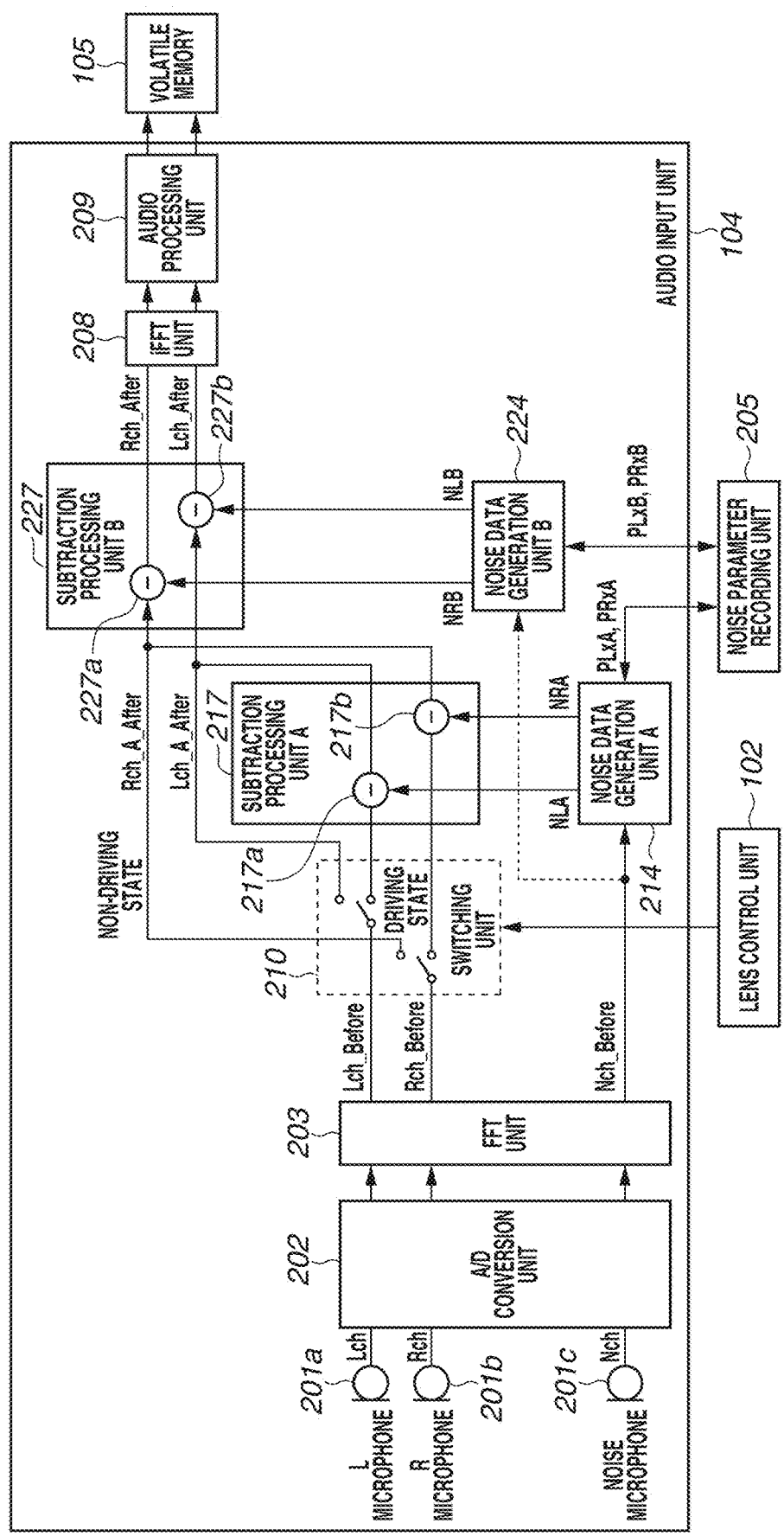
FIG. 11 is a block diagram illustrating a configuration of an audio input unit of an imaging apparatus according to a third exemplary embodiment.

FIG. 11 is a block diagram illustrating a configuration example of an audio input unit 104 according to the third exemplary embodiment.

Microphones 201, an A/D conversion unit 202, an FFT unit 203, an iFFT unit 208, and an audio processing unit 209 illustrated in FIG. 11 are similar to those illustrated in FIG. 3, and a description thereof will thus be omitted.

A switching unit 210 switches paths based on control information from a lens control unit 102. In the present exemplary embodiment, when an optical lens 300 is being driven, the switching unit 210 switches the paths so that a subtraction processing unit A 217 to be described below performs noise reduction processing. When the optical lens 300 is not being driven, the switching unit 210 switches the paths so that the subtraction processing unit A 217 does not perform the noise reduction processing.

A noise data generation unit A 214 generates data for reducing lens driving-related noise included in Lch_Before and Rch_Before based on Nch_Before. The lens driving-related noise included in the audio signals input from the L and R microphones is an example of first noise. In the present exemplary embodiment, the noise data generation unit A 214 generates array data NLA[0] to NLA[512] for reducing noise included in Lch_Before[0] to Lch_Before[512], respectively, by using noise parameters. The noise data generation unit A 214 also generates array data NRA[0] to NRA[512] for reducing noise included in Rch_Before[0] to Rch_Before[512], respectively, by using noise parameters.

The array data NLA[0] to NLA[512] has the same frequency points as those of the array data Lch_Before[0] to Lch_Before[512]. The array data NRA[0] to NRA[512] has the same frequency points as those of the array data Rch_Before[0] to Rch_Before[512].

The pieces of array data NLA[0] to NLA[512] will be collectively referred to as NLA. The pieces of array data NRA[0] to NRA[512] will be collectively referred to as NRA. NLA and NRA are examples of third frequency spectral data.

The noise parameters for the noise data generation unit A 214 to use to generate NLA and NRA from Nch_Before are recorded in the noise parameter recording unit 205. In the present exemplary embodiment, the noise parameters to be used in the noise data generation unit A 214, recorded in the noise parameter recording unit 205, are lens driving-related noise parameters with respect to each lens type. In the present exemplary embodiment, the noise data generation unit A 214 does not switch the noise parameters while recording audio data.

The noise parameters for generating NLA from Nch_Before will be collectively referred to as PLxA. The noise parameters for generating NRA from Nch_Before will be collectively referred to as PRxA.

PLxA and PRxA have the same number of array elements as those of NLA and NRA, respectively. For example, PL1A includes pieces of array data PL1A[0] to PL1A[512]. The frequency points of PL1A are the same as those of Lch_Before. For example, PR1A includes pieces of array data PR1A[0] to PR1A[512]. The frequency points of PR1A are the same as those of Rch_Before. The noise parameters will be described below with reference to FIG. 12.

In the present exemplary embodiment, all the coefficients for each 513-point frequency spectrum are recorded in the noise parameter recording unit 205 as noise parameters. However, instead of the coefficients corresponding to all the 513 frequency points, at least ones for frequency points used to reduce noise can be recorded in the noise parameter recording unit 205. For example, coefficients corresponding to each frequency spectrum of 20 Hz to 20 kHz, considered to be typical audible frequencies, may be recorded in the noise parameter recording unit 205 as noise parameters, without those corresponding to the other frequency spectra. For example, coefficients for frequency spectra where the coefficients have a value of zero do not need to be recorded in the noise parameter recording unit 205 as noise parameters.

The subtraction processing unit A 217 subtracts NLA and NRA from Lch_Before and Rch_Before, respectively. For example, the subtraction processing unit A 217 includes an L subtractor A 217a for subtracting NLA from Lch_Before and an R subtractor A 217b for subtracting NRA from Rch_Before. The L subtractor A 217a subtracts NLA from Lch_Before to output 513-point array data Lch_A_After[0] to Lch_A_After[512]. The R subtractor A 217b subtracts NRA from Rch_Before to output 513-point array data Rch_A_After[0] to Rch_A_After[512]. In the present exemplary embodiment, the subtraction processing unit A 217 performs the subtraction processing using a spectral subtraction method. The subtraction processing unit A 217 subtracts noises related to noisy lens driving in particular.

A noise data generation unit B 224 generates data for reducing constant noise included in Lch_A_After and Rch_A_After based on Nch_Before.

In the present exemplary embodiment, the noise data generation unit B 224 generates array data NLB[0] to NLB[512] for reducing noise included in Lch_A_After[0] to Lch_A_After[512], respectively, by using noise parameters. The noise data generation unit B 224 also generates array data NRB[0] to NRB[512] for reducing noise included in Rch_A_After[0] to Rch_A_After[512], respectively, by using noise parameters.

The array data NLB[0] to NLB[512] has the same frequency points as those of the array data Lch_A_After[0] to Lch_A_After[512]. The array data NRB[0] to NRB[512] has the same frequency points as those of the array data Rch_A_After[0] to Rch_A_After[512].

The pieces of array data NLB[0] to NLB[512] will be collectively referred to as NLB. The pieces of array data NRB[0] to NRB[512] will be collectively referred to as NRB. NLB and NRB are examples of fourth frequency spectrum data.

The noise parameters for the noise data generation unit B 224 to use to generate NLB and NRB from Nch_Before are recorded in the noise parameter recording unit 205.

In the present exemplary embodiment, the noise parameters to be used in the noise data generation unit B 224, recorded in the noise parameter recording unit 205, are ones intended for floor noise and electrical noise of the microphones. In the present exemplary embodiment, the noise data generation unit B 224 does not switch the noise parameters while recording audio data.

The noise parameters for generating NLB from Nch_Before will be collectively referred to as PLxB. The noise parameters for generating NRB from Nch_Before will be collectively referred to as PRxB.

PLxB and PRxB have the same number of array elements as those of NLB and NRB, respectively. For example, PL1B includes pieces of array data PL1B[0] to PL1B[512]. The frequency points of PL1B are the same as those of Lch_Before. For example, PR1B includes pieces of array data PR1B[0] to PR1B[512]. The frequency points of PR1B are the same as those of Rch_Before. The noise parameters will be described below with reference to FIG. 12.

In the present exemplary embodiment, all the coefficients for each 513-point frequency spectrum are recorded in the noise parameter recording unit 205 as noise parameters. However, instead of the coefficients corresponding to all the 513 frequency points, at least ones for frequency points used to reduce noise can be recorded in the noise parameter recording unit 205. For example, coefficients corresponding to each frequency spectrum of 20 Hz to 20 kHz, considered to be typical audible frequencies, may be recorded in the noise parameter recording unit 205 as noise parameters, without those corresponding to the other frequency spectra. For example, coefficients for frequency spectra where the coefficients have a value of zero do not need to be recorded in the noise parameter recording unit 205 as noise parameters.

A subtraction processing unit B 227 subtracts NLB and NRB from Lch_A_After and Rch_A_After (or Lch_Before and Rch_Before), respectively. For example, the subtraction processing unit B 227 includes an L subtractor B 227a for subtracting NLB from Lch_A_After (or Lch_Before) and an R subtractor B 227b for subtracting NRB from Rch_A_After (or Rch_Before). The L subtractor B 227a subtracts NLB from Lch_A_After (or Lch_Before) to output 513-point array data Lch_After[0] to Lch_After[512]. The R subtractor B 227b subtracts NRB from Rch_A_After (or Rch_Before) to output 513-point array data Rch_After[0] to Rch_After[512]. In the present exemplary embodiment, the subtraction processing unit B 227 performs the subtraction processing using a spectral subtraction method.

In the present exemplary embodiment, the subtraction processing unit B 227 subtracts constantly-occurring noise other than the noises caused by lens driving. Examples include the floor noise and the electrical noise of the microphones. In the present exemplary embodiment, the noise data generation unit B 224 generates NLB and NRB based on Nch_Before. However, other methods may be used. For example, NLB and NRB may be recorded in the noise parameter recording unit 205, and the subtraction processing unit B 227 may directly read NLB and NRB from the noise parameter recording unit 205 not via the noise data generation unit B 224. The reason is that there is not much need to refer to the noises included in Nch_Before since the floor noise and the electrical noise of the microphones occur constantly.

In the present exemplary embodiment, the noise reduction processing is performed by the subtraction processing unit A 217 and then by the subtraction processing unit B 227 in this order. However, the noise reduction processing may be performed in reverse order, i.e., by the subtraction processing unit B 227 and then by the subtraction processing unit A 217.

The rest of the configuration and operations of the imaging apparatus 100 are similar to those of the first exemplary embodiment.

Noise Parameters According to Third Exemplary Embodiment

FIG. 12 illustrates an example of the noise parameters recorded in the noise parameter recording unit 205 according to the third exemplary embodiment. The noise parameters are parameters for correcting the audio signal generated by the noise microphone 201c obtaining driving noise occurring inside the housing of the imaging apparatus 100 and the housing of the optical lens 300. As illustrated in FIG. 12, in the present exemplary embodiment, PLxA, PRxA, PLxB, and PRxB are recorded in the noise parameter recording unit 205. The present exemplary embodiment will be described on an assumption that the source of the driving noise corresponding to PLxA and PRxA is in the housing of the optical lens 300. The driving noise occurring inside the housing of the optical lens 300 is conveyed to inside the housing of the imaging apparatus 100 via the lens mount 301, and obtained by the L microphone 201a, the R microphone 201b, and the noise microphone 201c.

In the present exemplary embodiment, a plurality of noise parameters corresponding to respective types of optical lens 300 is recorded in the noise parameter recording unit 205. The reason is that noise frequencies vary depending on the type of optical lens 300. The imaging apparatus 100 generates noise data using the noise parameter corresponding to the type of optical lens 300 among the plurality of noise parameters.

In the present exemplary embodiment, the imaging apparatus 100 records noise parameters corresponding to constant noise as PLxB and PRxB for each moving image mode. Examples of the constant noise include white noise as well as the floor noise and the electrical noise of the microphones. The imaging apparatus 100 may also record noise parameters for each type of optical lens 300 as well as for each temperature inside the housing of the imaging apparatus 100 and each tilt of the imaging apparatus 100, detected by the information obtaining unit 103.

The average of the coefficient values of PLxA and PRxA is greater than that of the coefficient values of PLxB and PRxB. The reason is that the noises to be reduced by PLxA and PRxA are higher in volume and more offensive to the ear than those to be reduced by PLxB and PRxB.

Timing Charts of Noise Reduction Processing According to Third Exemplary Embodiment The noise reduction processing according to the present exemplary embodiment will be described with reference to FIGS. 13A, 13B, 13D, 13G, 13H1, 13H2, and 13I.

FIGS. 13A, 13B, 13D, 13G, 13H1, 13H2, and 13I are examples of timing charts of audio processing by the noise data generation unit 204, the noise parameter selection unit 206, and the subtraction processing unit 207. The present exemplary embodiment discusses audio processing on Lch for ease of description, whereas audio processing on Rch is similarly performed. All the horizontal axes of the graphs in FIGS. 13A, 13B, 13D, 13G, 13H1, 13H2, and 13I are time axes.

FIG. 13A illustrates an example of the lens control signal. The lens control signal is a signal for the lens control unit 102 to control driving of the optical lens 300. In the present exemplary embodiment, the level of the lens control signal is expressed in two values, high and low. The level of the lens control signal is high if the lens control unit 102 is controlling the optical lens 300 to be driven.

In other words, if the level of the lens control signal is high, the control unit 111 can determine that noise is occurring from the optical lens 300. The level of the lens control signal is low if the lens control unit 102 is not controlling the optical lens 300 to be driven.

FIG. 13B is a graph illustrating an example of the value of Lch_Before[n]. The vertical axis indicates the value of Lch_Before[n]. In the present exemplary embodiment, Lch_Before[n] represents the signal at the nth frequency point where a signal indicating the driving noise of the optical lens 300 appears characteristically in Lch_Before output from the FFT unit 203. While the present exemplary embodiment describes the signal at the nth frequency point, the audio processing is also similarly performed on the other frequencies. Signals V and W represent signals including noise. In the present exemplary embodiment, the signals V represent noise signals including noise due to lens driving. The signals W represent noise signals including constant noise such as the floor noise and the electrical noise of the microphones.

FIG. 13D is a graph illustrating an example of the value of Nch_Before[n]. Nch_Before[n] represents the signal at the nth frequency point where a signal indicating driving noise of the optical lens 300 appears characteristically in Nch_Before output from the FFT unit 203. The vertical axis indicates the value of Nch_Before[n]. The noise signals represented by the signals V and W in FIG. 13B appear more characteristically in Nch_Before[n] than in Lch_Before[n].

FIG. 13G illustrates an example of operating states of the subtraction processing unit A 217 and the subtraction processing unit B 227 selected by the switching unit 210. In the present exemplary embodiment, blank sections indicate that the noise reduction processing is being performed by only the subtraction processing unit B 227. Lattice-patterned sections indicate that the noise reduction processing is being performed by the subtraction processing unit A 217 and the subtraction processing unit B 227.

FIG. 13H1 is a graph illustrating an example of the value of NLA[n]. In the present exemplary embodiment, NLA[n] indicates the value of the signal at the nth frequency point in NLA generated by the noise data generation unit A 214. The vertical axis indicates the value of NLA[n].

FIG. 13H2 is a graph illustrating an example of the value of NLB[n]. In the present exemplary embodiment, NLB[n] indicates the value of the signal at the nth frequency point in NLB generated by the noise data generation unit B 224. The vertical axis indicates the value of NLB[n].

FIG. 13I is a graph illustrating an example of the value of Lch_After[n]. In the present exemplary embodiment, Lch_After[n] indicates the value of the signal at the nth frequency point in Lch_After output from the subtraction processing unit A 217. The vertical axis indicates the value of Lch_After[n].

Next, the timing of the operations will be described with reference to times t1301 to t1302.

At time t1301, the lens control unit 102 outputs a high signal to the optical lens 300 and the noise parameter selection unit 206 as the lens control signal (FIG. 13A).

At time t1301, the switching unit 210 switches the noise reduction processing from that by only the subtraction processing unit B 227 to that by the subtraction processing unit A 217 and the subtraction processing unit B 227 (FIG. 13G). From time t1301, the noise data generation unit A 214 generates NLA[n] based on Nch_Before[n] and the noise parameter PLxA[n] (FIG. 13H1). Alternatively, the noise data generation unit A 214 may constantly generate NLA[n], and the subtraction processing unit A 217 may start subtraction when the lens control signal is turned to high. The noise data generation unit B 224 generates NLB[n] based on Nch_Before[n] and the noise parameter PLxB[n] (FIG. 13H2).

From time t1301, the subtraction processing unit A 217 and the subtraction processing unit B 227 subtract NLA[n] and NLB[n] from Lch_Before[n] to output Lch_After[n] (FIG. 13I).

At time t1302, the lens control unit 102 determines that the driving of the optical lens 300 has ended, and outputs a low signal to the optical lens 300 and the noise parameter selection unit 206 as the lens control signal (FIG. 13A).

At time t1302, the switching unit 210 switches the noise reduction processing from that by the subtraction processing unit A 217 and the subtraction processing unit B 227 to that by only the subtraction processing unit B 227 (FIG. 13G). From time t1302, the subtraction processing unit A 217 is not used, and thus NLA[n] is not used (shaded section in FIG. 13H1). By contrast, NLB[n] generated by the noise data generation unit B 224 continues to be used by the subtraction processing unit B 227 (FIG. 13H2).

At time t1302, the subtraction processing unit B 227 subtracts NLB[n] from Lch_Before[n] to output Lch_After[n] (FIG. 13I).

The audio input unit 104 subsequently performs the foregoing noise reduction processing based on the signals output from the lens control unit 102.

The imaging apparatus 100 can suppress power consumption by switching the noise reduction processing to be performed only during driving of the optical lens 300 in such a manner based on the lens control signal.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2020-143204, filed Aug. 27, 2020, No. 2020-161436, filed Sep. 25, 2020, No. 2020-161437, filed Sep. 25, 2020, No. 2020-161438, filed Sep. 25, 2020, and No. 2021-072811, filed Apr. 22, 2021, which are hereby incorporated by reference herein in their entirety.

What is claimed is:

1. An audio processing apparatus comprising:
a first microphone that obtains ambient sound;
a second microphone that obtains noise from a noise source;
a CPU; and
a memory storing a program that, when executed by the CPU, causes the audio processing apparatus to function as:
a first conversion unit configured to perform a Fourier transform on an audio signal from the first microphone to generate a first audio signal;
a second conversion unit configured to perform a Fourier transform on an audio signal from the second microphone to generate a second audio signal;
a generation unit configured to generate first noise data corresponding to the noise of the noise source by using the second audio signal and a noise parameter related to the noise of the noise source;
a noise reduction unit including a first reduction unit configured to perform a process for reducing the noise of the noise source from the first audio signal based on the first noise data and a second reduction unit configured to perform a process for reducing constant noise from the first audio signal or an audio signal output from the first reduction unit;
a switching unit configured to switch whether to perform the process for reducing the noise of the noise source by the first reduction unit based on whether the noise source is generating the noise; and
a third conversion unit configured to perform an inverse Fourier transform on an audio signal obtained by the process having been performed by the second reduction unit.

2. The audio processing apparatus according to claim 1, wherein the first microphone includes a left channel microphone and a right channel microphone, and
wherein the generation unit generates the first noise data for each of the left channel microphone and the right channel microphone.

3. The audio processing apparatus according to claim 1, wherein the audio processing apparatus has a hole through which the ambient sound is input above the first microphone and no hole through which the ambient sound is input above the second microphone.

4. The audio processing apparatus according to claim 1, wherein the noise parameter is a ratio in amplitude between the first audio signal and the second audio signal that are obtained in a case where there is considered to be no ambient sounds.

5. The audio processing apparatus according to claim 1, wherein the switching unit outputs the first audio signal to one of the first reduction unit and the second reduction unit based on whether the noise source is generating the noise.

6. The audio processing apparatus according to claim 5, wherein the switching unit outputs the first audio signal to the first reduction unit in a case where the noise source is generating the noise, and outputs the first audio signal to the second reduction unit in a case where the noise source is not generating the noise, and
wherein the second reduction unit performs the process for reducing the constant noise from the first audio signal in a case where the noise source is not generating the noise, and performs the process for reducing the constant noise from the audio signal output from the first reduction unit in a case where the noise source is generating the noise.

7. The audio processing apparatus according to claim 5, wherein the generation unit generates second noise data corresponding to the constant noise, and
wherein the second reduction unit reduces the constant noise from one of the first audio signal output from the switching unit and the audio signal output from the first reduction unit based on the second noise data.

8. The audio processing apparatus according to claim 7, wherein the generation unit is configured to read the second noise data from a recording unit in which the second noise data is recorded in advance.

9. The audio processing apparatus according to claim 1, wherein the switching unit is configured to switch whether to perform the process for reducing the noise of the noise source by the first reduction unit based on a control signal for controlling a driving circuit that is the noise source.

10. The audio processing apparatus according to claim 9, wherein the driving circuit moves a lens,
wherein the program, when executed by the CPU, further causes the audio processing apparatus to function as a lens control unit configured to output the control signal to the driving circuit to cause the lens to be moved.

11. The audio processing apparatus according to claim 1, wherein the constant noise includes at least one of white noise, floor noise of the first microphone and electrical noise of the first microphone.

12. A control method of an audio processing apparatus including a first microphone that obtains ambient sound and a second microphone that obtains noise of a noise source, the control method comprising:
performing a Fourier transform on an audio signal from the first microphone to generate a first audio signal;

performing a Fourier transform on an audio signal from the second microphone to generate a second audio signal;

generating first noise data corresponding to the noise of the noise source by using the second audio signal and a noise parameter related to the noise of the noise source;

performing a first noise reduction process for reducing the noise of the noise source from the first audio signal based on the first noise data;

switching whether to perform the first noise reduction process based on whether the noise source is generating the noise;

performing a second noise reduction process for reducing constant noise from the first audio signal or an audio signal output from the first noise reduction process; and performing an inverse Fourier transform on an audio signal obtained by performing the second noise reduction process.

13. The method according to claim 12,
wherein the switching performs the switch such that the first noise reduction process is performed in a case where the noise source is generating the noise and the first noise reduction process is not performed in a case where the noise source is not generating the noise, and
wherein the second noise reduction process reduces the constant noise from the audio signal output from the first noise reduction process in a case where the first noise reduction process is performed, and reduces the constant noise from the first audio signal in a case where the first noise reduction process is not performed.

14. The method according to claim 12, wherein the generating generates second noise data corresponding to the constant noise, and wherein the second noise reduction process reduces the constant noise from one of the first audio signal and the audio signal output from the first noise reduction process based on the second noise data.

15. The method according to claim 14, wherein the generating reads the second noise data from a recording unit in which the second noise data is recorded in advance.

16. The method according to claim 12, wherein the switching switches whether to perform the first noise reduction process based on a control signal for controlling a driving circuit that is the noise source.

17. The method according to claim 16, wherein the driving circuit moves a lens and the control signal is output to the driving circuit to cause the lens to be moved.

18. The method according to claim 12, wherein the constant noise includes at least one of white noise, floor noise of the first microphone and electrical noise of the first microphone.

19. A non-transitory computer-readable recording medium recording a program for causing an audio processing apparatus to perform a control method, the audio processing apparatus including a first microphone that obtains ambient sound and a second microphone that obtains noise of a noise source, the control method comprising:

performing a Fourier transform on an audio signal from the first microphone to generate a first audio signal;

performing a Fourier transform on an audio signal from the second microphone to generate a second audio signal;

generating noise data corresponding to the noise of the noise source by using the second audio signal and a noise parameter related to the noise of the noise source;

performing a first noise reduction process for reducing the noise of the noise source from the first audio signal based on the first noise data;

switching whether to perform the first noise reduction process based on whether the noise source is generating the noise;

performing a second noise reduction process for reducing constant noise from the first audio signal or an audio signal output from the first noise reduction process; and performing an inverse Fourier transform on an audio signal obtained by performing the second noise reduction process.

* * * * *